United States Patent
Worth

(10) Patent No.: US 11,889,819 B2
(45) Date of Patent: Feb. 6, 2024

(54) METHODS AND APPARATUS TO ADAPTIVELY OPTIMIZE FEED BLEND AND MEDICINAL SELECTION USING MACHINE LEARNING TO OPTIMIZE ANIMAL MILK PRODUCTION AND HEALTH

(71) Applicant: SUBSTRATE AI SA, Madrid (ES)

(72) Inventor: James Brennan Worth, Aurora, CO (US)

(73) Assignee: Substrate AI SA, Madrid (ES)

( * ) Notice: Subject to any disclaimer, the term of this patent is extended or adjusted under 35 U.S.C. 154(b) by 195 days.

(21) Appl. No.: 17/488,706

(22) Filed: Sep. 29, 2021

(65) Prior Publication Data

US 2023/0101777 A1 Mar. 30, 2023

(51) Int. Cl.
| | |
|---|---|
| *A01K 29/00* | (2006.01) |
| *A23K 10/00* | (2016.01) |
| *G06N 20/00* | (2019.01) |
| *G06F 18/21* | (2023.01) |

(52) U.S. Cl.
CPC ............ *A01K 29/005* (2013.01); *A23K 10/00* (2016.05); *G06F 18/217* (2023.01); *G06N 20/00* (2019.01)

(58) Field of Classification Search
CPC ...... A01K 29/005; A23K 10/00; A23K 50/10; G06F 18/217; G06N 20/00; A23N 17/00
USPC ..................................... 340/573.3; 119/14.08
See application file for complete search history.

(56) References Cited

U.S. PATENT DOCUMENTS

| | | | |
|---|---|---|---|
| 9,959,507 B2 | 5/2018 | Mathur et al. | |
| 10,354,342 B2 | 7/2019 | Kuper et al. | |
| 2002/0004098 A1* | 1/2002 | Dahlen | A23K 50/10 426/656 |
| 2014/0116341 A1* | 5/2014 | Kopic | A01J 99/00 119/14.02 |
| 2016/0324126 A1* | 11/2016 | Johnston | A23K 50/10 |
| 2019/0371426 A1* | 12/2019 | Embree | G16B 5/00 |
| 2020/0176088 A1* | 6/2020 | Kanamarlapudi | G16C 20/70 |
| 2020/0194126 A1* | 6/2020 | Lim | C12Q 1/689 |
| 2020/0332013 A1* | 10/2020 | Weber | G01N 33/6854 |
| 2023/0098374 A1 | 3/2023 | Worth | |
| 2023/0103420 A1 | 4/2023 | Worth | |

OTHER PUBLICATIONS

Baumeister, R. F. et al., "Do Conscious Thoughts Cause Behavior?," Annu. Rev. Psychol. 62:331-361 (2011).

(Continued)

*Primary Examiner* — Omar Casillashernandez
(74) *Attorney, Agent, or Firm* — COOLEY LLP

(57) ABSTRACT

Embodiments disclosed include systems, apparatus, and/or methods to receive a target health status of and/or quality of bioproduct produced by a managed livestock and indications of health status and quality of bioproduct. The systems, apparatus, and/or methods generate a set of input vectors based on the target health status or bioproduct quality, and the indications of bioproduct quality, and health status, and provide the set of input vectors to a machine learning model trained to generate an output indicating a feed selection. The feed selection can be included in a feed blend and administered to the managed livestock, such that, upon consumption, it increases a likelihood of collectively improving the health status of the managed livestock and the bioproduct quality of the managed livestock.

19 Claims, 16 Drawing Sheets

(56) References Cited

OTHER PUBLICATIONS

Bechara, A. et al., "Emotion, Decision Making and the Orbitofrontal Cortex," Cerebral Cortex, vol. 10, Issue 3, pp. 295-307 (Mar. 2000).
Bhatt, S., "Reinforcement learning 101," Mar. 2018, [online], Retrieved from the Internet: https://towardsdatascience.com/reinforcement-learning-101-e24b50e1d292, 8 pages.
Borchers, M. R. et al., "Machine-learning-based calving prediction from activity, lying, and ruminating behaviors in dairy cattle," J. Dairy Sci. 100(7):5664-5674 (Jul. 2017).
Chica, A. B. et al., "Attentional Routes to Conscious Perception," Frontiers in Psychology, vol. 3, Article 1, pp. 1-12 (Jan. 2012).
Chun, M. M. et al., "Memory: Enduring traces of perceptual and reflective attention," Neuron, 72(4):520-535 (Nov. 2011).
Egger, D. J. et al., "Credit Risk Analysis Using Quantum Computers," IEEE Transactions on Computers, vol. 70, No. 12, pp. 2136-2145 (Dec. 2021).
Fukuda, K. et al., "Quantity, not quality: The relationship between fluid intelligence and working memory capacity," Psychonomic Bulletin & Review, 17(5):673-679 (Oct. 2010).
Girard, N., "Characterizing strategic patterns of farms with knowledge-based temporal abstraction: The case of suckler sheep farms," AI Applications, 10(3):41-55 (1996).
Kebreab, E. et al., "A new modeling environment for integrated dairy system management," Animal Frontiers, vol. 9, No. 2, pp. 25-32 (Apr. 2019).
Koziol, L. F. et al., "Consensus Paper: The Cerebellum's Role in Movement and Cognition," Cerebellum, 13(1):151-177 (Feb. 2014).
Liakos, K. G. et al., "Machine Learning in Agriculture: A Review," Sensors, 18:2674, 29 pages (2018).
Liebe, D. M. et al., "Analytics in sustainable precision animal nutrition," Animal Frontiers, vol. 9, Issue 2, pp. 16-24 (Apr. 2019).
Lockwood, O. et al., "Reinforcement Learning with Quantum Variational Circuits," Proceedings of the Sixteenth AAAI Conference on Artificial Intelligence and Interactive Digital Entertainment (AIIDE-20), pp. 245-251 (2020).
Marchetti, G. "Against the view that consciousness and attention are fully dissociable," Frontiers in Psychology, vol. 3, Article 36, pp. 1-14 (Feb. 2012).
McCabe, D. P. et al., "The Relationship Between Working Memory Capacity and Executive Functioning: Evidence for a Common Executive Attention Construct," Neuropsychology, vol. 24, No. 2, pp. 222-243 (Mar. 2010).
McKnight, L. et al., "Modeling of livestock systems to enhance efficiency," Animal Frontiers, vol. 9, Issue 2, pp. 3-5 (Apr. 2019).
Morota, G. et al., "Big Data Analytics and Precision Animal Agriculture Symposium: Machine learning and data mining advance predictive big data analysis in precision animal agriculture," J. Anim. Sci. 2018.96:1540-1550.
Muzzio, I. A. et al., "What is remembered? Role of attention on the encoding and retrieval of hippocampal representations," J Physiol. Jun. 15, 2009; 587(Pt 12):2837-2854.
NIPS 2007 Workshop, Hierarchical Organization of Behavior, 2007, 12 pages.
Rebentrost, P. et al., "Quantum computational finance: quantum algorithm for portfolio optimization," [Online], Retrieved from the Internet: URL: arXiv:1811.03975, 18 pages (Nov. 2018).
Stamatopoulos, N. et al., "Option Pricing using Quantum Computers," [Online], Retrieved from the Internet: URL: arXiv:1905.02666, pp. 1-20 (Feb. 18, 2020).
Suparwito, H. et al., "A Hierarchical Classification Method Used to Classify Livestock Behaviour from Sensor Data," In: R. Chamchong and K. W. Wong (Eds.): MIWAI 2019, LNAI 11909, Springer Nature Switzerland AG 2019, pp. 204-215 (2019).
Sutton, R. S. et al., "Between MDPs and semi-MDPs: A framework for temporal abstraction in reinforcement learning," Artificial Intelligence 112 (1999) 181-211.
Sutton, R. S. et al., "Reinforcement Learning: An Introduction," Second Edition, in progress, A Bradford Book, The MIT Press, Cambridge, Massachusetts (2014), 352 pages.
Valletta, J. J. et al., "Applications of machine learning in animal behaviour studies," Animal Behavior, 124:203-220 (2017).
Wanga, H. P. et al., "Designing a machine learning—based framework for enhancing performance of livestock mobile application system," American Journal of Software Engineering and Applications, 4(3):56-64 (Apr. 2015).
Flet-Berliac, Y., "The Promise of Hierarchical Reinforcement Learning," The Gradient, 30 pages (Mar. 2019).
Huang, J. et al., "Hyperparameter Auto-tuning in Self-Supervised Robotic Learning," IEEE Robotics and Automation Letters (RAL), presented at ICRA 2021 and presented at NeurIPS 2020 DRL workshop, [online], Retrieved from the Internet: arXiv:2010.08252, 8 pages, Mar. 2021.
Liessner, R. et al., "Hyperparameter Optimization for Deep Reinforcement Learning in Vehicle Energy Management," In Proceedings of the 11th International Conference on Agents and Artificial Intelligence (ICAART 2019), pp. 134-144 (2019).
Neary, P. L., "Automatic Hyperparameter Tuning in Deep Convolutional Neural Networks Asynchronous Reinforcement Learning," 2018 IEEE International Conference on Cognitive Computing (ICCC), 5 pages (Jul. 2018).

\* cited by examiner

METHODS AND APPARATUS TO ADAPTIVELY OPTIMIZE FEED BLEND AND MEDICINAL SELECTION USING MACHINE LEARNING TO OPTIMIZE ANIMAL MILK PRODUCTION AND HEALTH

BACKGROUND

The embodiments described herein relate to methods and apparatus for automated management of livestock producing bioproducts using machine learning.

In the past decade, technological advancements in intensive livestock management techniques have expanded greatly. Farmers can economically collect data on many aspects of animal health and bioproduct (e.g., milk) variables during various phases of life of an animal (e.g., during phases of a lactation, production cycle or a reproductive cycle). Using this data, veterinarians can attempt to alter feed blends that include selected feeds and/or medicinal treatments that the animals consume to alter animal health and/or alter properties of a bioproduct. In some instances, animals may experience health related illnesses that render them unable to efficiently utilize the feed and/or nutrients provided to them incurring a waste of resources and/or a loss of production. Animal health specialists can be used to identify and rectify such problems. Conventionally, this gathering of data and decision making is done manually, involves consultation with a specialist and is time consuming, uneconomical, and error prone. There also may exist a complexity to effectively manage a large livestock due to the varied needs of livestock and demand on time when a specialist can physically visit farms.

Accordingly, there exists a need to automate a process of management of livestock that produce bioproducts that improves the availability and decrease costs related to services associated with specialists while not impacting quality of care to animals.

SUMMARY

In some embodiments, a method includes training a machine learning model associated with a set of hyperparameters to receive an indication associated with a health status of a managed livestock and a value associated with a bioproduct quality of the managed livestock, and output, based on the set of hyperparameters, a feed selection. The feed selection is configured to increase a likelihood of collectively improving the health status of the managed livestock and the bioproduct quality of the managed livestock. The method further includes receiving, at a first time, a first value of the bioproduct quality and a first indication of the health status of the managed livestock. The method includes generating a set of input vectors based on the first value of the bioproduct quality and the first indication of the health status of the managed livestock. The method further includes providing the set of input vectors to the machine learning model to generate a first output indicating a first feed selection to be used to feed the managed livestock. The first feed selection is configured to, upon consumption, collectively improve the health status of the managed livestock and the bioproduct quality of the managed livestock based on the first value and the first indication. The method further includes receiving, at a second time, a second value of the bioproduct quality and a second indication of the health status of the managed livestock. The method includes automatically adjusting at least one hyperparameter from the set of hyperparameters in response to receiving the second value of the bioproduct quality and the second indication of the health status such that that the machine learning model is configured to generate a second output indicating a second feed selection to be used to feed the managed livestock. The second feed selection is configured to, upon consumption, collectively improve the health status of the managed livestock and the bioproduct quality of the managed livestock based on the second value and the second indication.

In some embodiments, an apparatus, includes a memory and a hardware processor operatively coupled to the memory. The hardware processor is configured to train a machine learning model to receive inputs associated with health status of a managed livestock and receive a value associated with a bioproduct quality of the managed livestock. The hardware processor is further configured to identify temporal abstractions based on the inputs and the value to be used to identify a feed selection. The feed selection is configured to increase a likelihood of collectively improving the health status of the managed livestock and the bioproduct quality of the managed livestock. The hardware processor is further configured to receive at least one of a target value of the bioproduct quality or a target value of the health status and receive a current value of the bioproduct quality and a current indication of the health status of the managed livestock. The hardware processor is further configured to generate a set of feature vectors based on the current value of the bioproduct quality, the current indication of the health status, and the at least one of the target value of the bioproduct quality or the target value of the health status. The hardware processor is further configured to provide the set of feature vectors to the machine learning model to generate, based on the temporal abstractions identified by the machine learning model, an output including a feed selection. The feed selection is such that, upon consumption by the managed livestock, it increases a likelihood of collectively improving the health status of the managed livestock and the bioproduct quality of the managed livestock.

Embodiments disclosed include a non-transitory processor-readable medium storing code representing instructions to be executed by a processor. The instructions include code to cause the processor to receive (i) at least one of a target value of a health status of a managed livestock or a target value of a bioproduct quality of the managed livestock, (ii) an indication of the health status of the managed livestock, and (iii) an indication of the bioproduct quality of the managed livestock. The instructions include code to cause the processor to generate a set of input vectors based on the at least one of the target value of the health status or the target value of the bioproduct quality, the indication of the bioproduct quality, and the indication of health status. The instructions further include code to cause the processor to provide the set of input vectors to a machine learning model trained to generate an output indicating a feed selection to be used to feed the managed livestock. The feed selection is configured to, upon consumption, increase a likelihood of collectively improving the health status of the managed livestock and the bioproduct quality of the managed livestock. The feed selection is further configured to be included in a feed blend to be administered to the managed livestock.

DETAILED DESCRIPTION

Figure 1:
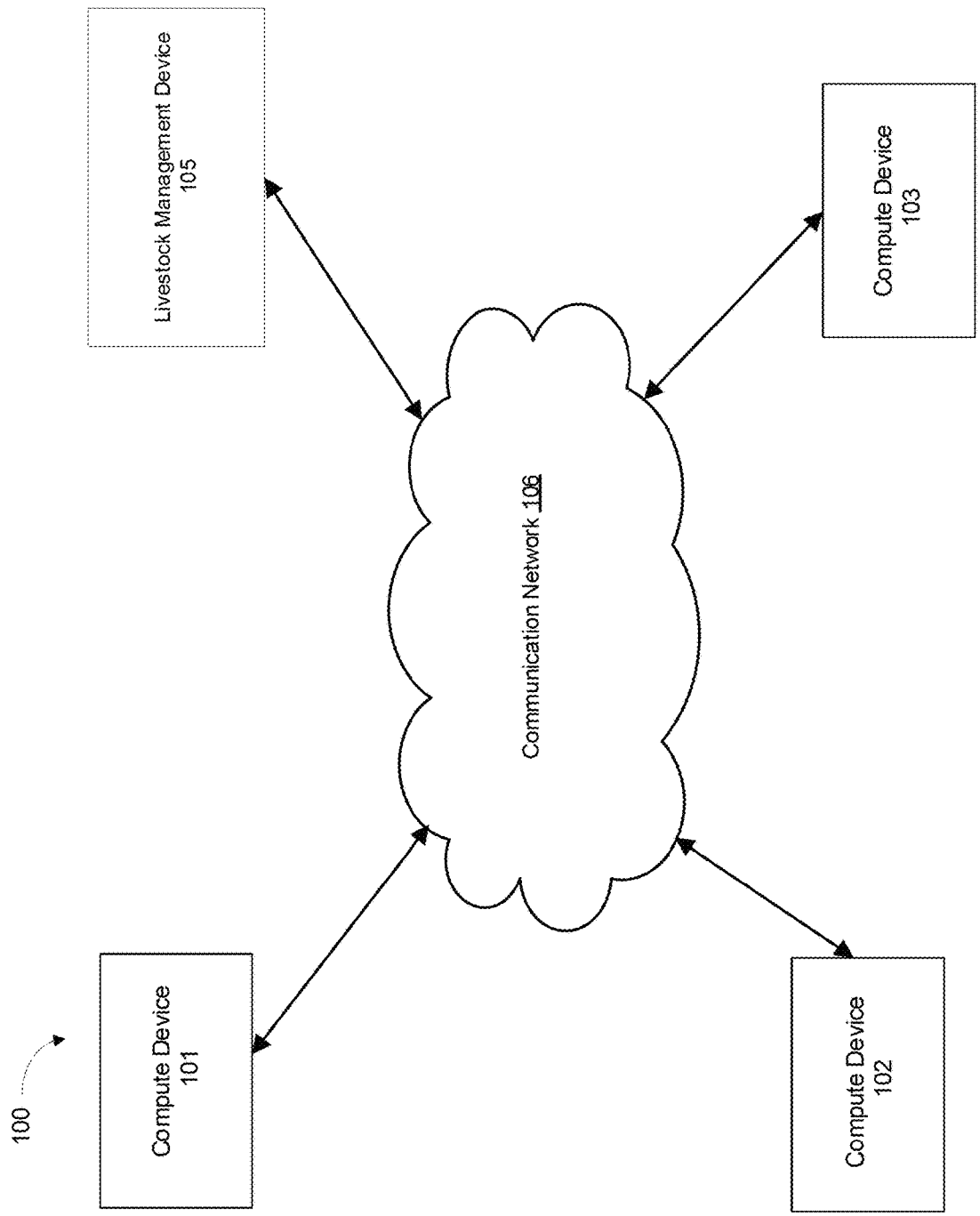
FIG. 1 is a schematic illustration of an automatic livestock management system, according to an embodiment.

In some embodiments, a method includes training a machine learning model associated with a set of hyperparameters to receive an indication associated with a health status of a managed livestock and a value associated with a bioproduct quality of the managed livestock. The machine learning model is configured to output, based on the set of hyperparameters, a feed selection configured to increase a likelihood of collectively improving the health status of the managed livestock and the bioproduct quality of the managed livestock. The method includes receiving, at a first time, a first value of the bioproduct quality and a first indication of the health status of the managed livestock. The method further includes generating a set of input vectors based on the first value of the bioproduct quality and the first indication of the health status of the managed livestock. The method further includes providing the set of input vectors to the machine learning model to generate a first output indicating a first feed selection to be used to feed the managed livestock. The first feed selection is configured to, upon consumption, collectively improve the health status of the managed livestock and the bioproduct quality of the managed livestock based on the first value and the first indication. The method further includes receiving, at a second time, a second value of the bioproduct quality and a second indication of the health status of the managed livestock. The method also includes automatically adjusting at least one hyperparameter from the set of hyperparameters in response to receiving the second value of the bioproduct quality and the second indication of the health status such that that the machine learning model is configured to generate a second output indicating a second feed selection to be used to feed the managed livestock. The second feed selection is configured to, upon consumption, collectively improve the health status of the managed livestock and the bioproduct quality of the managed livestock based on the second value and the second indication.

In some embodiments, an apparatus includes a memory and a processor. The processor is configured to train a machine learning model to receive inputs associated with health status of a managed livestock and a value associated with a bioproduct quality of the managed livestock, and identify temporal abstractions based on the inputs and the value to be used to identify a feed selection. The feed selection is configured to increase a likelihood of collectively improving the health status of the managed livestock and the bioproduct quality of the managed livestock. The processor is further configured to receive at least one of a target value of the bioproduct quality or a target value of the health status, a current value of the bioproduct quality and a current indication of the health status of the managed livestock. The processor is further configured to generate a set of feature vectors based on the current value of the bioproduct quality, the current indication of the health status, and the at least one of the target value of the bioproduct quality or the target value of the health status. The processor is further configured to provide the set of feature vectors to the machine learning model to generate, based on the temporal abstractions identified by the machine learning model, an output including a feed selection. The feed selection is configured to, upon consumption by the managed livestock, increase a likelihood of collectively improving the health status of the managed livestock and the bioproduct quality of the managed livestock.

Disclosed embodiments include a non-transitory processor-readable medium storing code representing instructions to be executed by a processor, the instructions including code to cause the processor to receive at least one of a target value of a health status of a managed livestock or a target value of a bioproduct quality of the managed livestock, an indication of the health status of the managed livestock, and an indication of the bioproduct quality of the managed livestock. The instructions further include code to cause the processor to generate a set of input vectors based on the at least one of the target value of the health status or the target value of the bioproduct quality, the indication of the bioproduct quality, and the indication of health status. The instructions further include code to cause the processor to provide the set of input vectors to a machine learning model trained to generate an output indicating a feed selection to be used to feed the managed livestock. The feed selection is configured to be included in a feed blend to be administered to the managed livestock. The feed selection is further configured to, upon consumption, increase a likelihood of collectively improving the health status of the managed livestock and the bioproduct quality of the managed livestock.

FIG. 1 is a schematic illustration of a livestock management system 100, also referred to herein as "an LM system" or "a system". The LM system 100 is configured to help with intensive management of livestock that produce bioproducts (e.g., milk, eggs, fiber (e.g., wool), honey, etc.) using machine learning models and/or tools. The LM system 100 can be configured to provide procedural guidance directed to obtain a desirable balance between and/or a collective improvement of health status of managed livestock, a quality/quantity of yield of bioproducts from the livestock, and/or a reduced cost associated with management of the livestock. The managed livestock can be raised to produce bioproducts and/or to maintain a colony of the livestock. For example, farmers can manage livestock including animals that produce milk (e.g., cows, goats, etc.), poultry producing eggs, animals used to produce meat, animals that produce fiber (e.g., wool, silk, etc.) and/or the like. The LM system 100 can be used to implement machine learning models to adaptively optimize the selection of feed blends and medicinal treatments to maintain the production and health of intensively managed livestock. In some embodiments, the LM system 100 can be used to optimize procedures adaptively to meet desired goals that can be defined based on improvement or maintenance in one or more target aspects. The aspects can include a quantity, quality, and/or rate of production of bioproducts, a cost associated with management and handling of animals, a property associated with health status of one or more animals, a reduced measure of loss of resources and/or loss of production, and/or the like. In some embodiments, the desired goal can be a target balance between two or more aspects, or a collective improvement in two or more aspects.

Farmers or livestock managers typically target a balance between high quality/quantity of bioproducts produced by a livestock and costs incurred in maintaining and managing health of the livestock. Achieving and/or maintaining a high quality/quantity of bioproducts and consistent health of livestock can involve tracking, from time to time, data associated with the bioproducts and also tracking health status of the livestock. For example, a managed livestock that produces milk can be tracked by intermittently collecting data from milk production including: fat content, protein content, days in milk, production average, dry extract, liters produced per day, urea, bacteria count, inhibitors, casein and somatic cell count. Health status can also be tracked using indicators related to an animal (e.g., weight, feed intake, restfulness, behavior, activity, etc.). In some instances, information related to livestock management including feed and medicinal treatments applied to animals in a livestock, resources utilized and/or provided to the animals, and the like can also be tracked. With data related the health and management of livestock and the corresponding measurements of milk production an LM system 100 can build a machine learning model to simulate the interactions between the data to build recommendations for future feed selection and medical treatments. In some instances, the LM system 100 can use the machine learning model to recommend animal care/feed schedules configured to keep a set of health parameters of the animals above target thresholds while optimizing bioproduct yield as much as possible.

In some instances, each animal can have different needs at different phases of life (e.g., growth phase, reproductive phase, etc.) and an optimal balance of nutrients may be used for optimal and/or increased production of bioproduct. Maintaining such as balance can include specialized care of animals that can be challenging to implement across animals in a cohort. Farmers can collect extensive data on health and/or wellbeing of animals at different stage of life (e.g., animals at phases during the reproductive cycle, lactation cycle, growth cycle, etc.). In some instances, animal health specialists or veterinarians can use data collected by animal handlers or farmers and draw insights and/or aid in monitoring the health and production properties of the intensively managed livestock. As an example, to achieve high milk production and protein content in milk bearing livestock, a high protein diet can be provided. When the animal is experiencing health related illnesses, however, protein from the feed can be wastefully leaked out through the urea of the animal and is considered a production loss. Such a loss may be indicated by a property associated with health status of the animals or a property associated with a quality of bioproduct produced by the animal. A farmer may desire to minimize this wasted protein through feed blends while providing medical treatments to address health related issues that are causing the livestock to produce milk inefficiently. Such a balanced or collective improvement of health status of a livestock and production of bioproduct can be carried out with expert guidance from specialists. For example, using the data collected from the livestock, veterinarians can provide recommendations of feed selection or feed mixes and/or medicinal treatments to be administered to specific animals to achieve specific target results (e.g., a target value of a bioproduct quality, or a target value of a health status of one or more animals in a livestock). Invoking insights from veterinarians or animal health specialists or similar skilled livestock management consultants, however, can be time consuming, involving the specialist's physical visit to the farm to inspect the animals and is not cost effective. Additionally, the animal health specialists can provide limited time/input to each client who can be a farmer of to each animal in a livestock, which makes it challenging to provide specialized care of all animals in a cohort effectively.

The LM system 100 is configured to implement machine learning models and/or tools to handle the process of providing specialized care of animals, resource allocation, organization, and/or maintenance of animals in a managed livestock to meet specific requirements of health and state of the animals in the livestock and/or quality of bioproducts produced by the animals. The LM system 100 can be configured to carry out the maintenance of a livestock automatically with minimal human intervention. The LM system 100 can be configured to aid in collectively improving and/or maintaining a health status of a managed livestock and the bioproduct quality of the managed livestock. The LM system 100 can be configured to aid in collectively improving and/or maintaining a desired balance between quality of bioproduct produced by livestock and health status and/or maintenance cost associated with the livestock. The LM system 100 can reach the desired balance by ensuring that each animal in a managed livestock receives optimal and/or sufficient nutrients and/or medicinal input customized to the needs of that particular animal to maximize and/or increase likelihood of achieving a minimized and/or reduced loss in production or reduced wastage of resources. The LM system 100 can be configured to improve the availability of services including expert guidance in a selection of feed/medicine and/or a schedule of feed while decreasing a cost associated with the services and/or while not impacting quality of care to animals.

The livestock management (LM) system 100 is configured to manage receiving information from a set of compute devices 101-103 and, based on the information, implement an automatic livestock management process including evaluating procedural alternatives, making choices from the alternatives, and/or implementing rules. The choices, decisions, or rules can be associated with any suitable action or resource related to intensively managed livestock (e.g., animal selection for optimal birthing, animal selection for obtaining bioproduct, analysis of a state of an animal, feed selection, medicine selection, bioproduct analysis, resource allocation, and/or the like). The livestock management system 100 can receive data related to health and/or bioproduct produced by a cohort of animals. In some instances, the LM system 100 can receive data related to a quality of bioproduct of interest to a specified customer and/or a farmer. For example, in some implementations of maintaining a livestock that produces milk, the LM system 100 can receive data from analysis of milk produced by the animals. The data can include measures of quantity/quality of properties of the milk and/or contents of the milk including fat, protein, days in milk production, average milk production, dry extract, a volume of milk (e.g., liters per day), urea, bacterial count (e.g., an absolute or relative count of types and/or number of bacterial cells/species/phyla/colonies etc.), inhibitors, casein and somatic cell count and/or the like. In some instances, the LM system can receive data related to costs of maintenance of a cohort of livestock, a cost associated with feed/medicine provided to animals in a cohort of livestock, and/or an efficiency associated with a measure of reproductive success and/or a yield of bioproduct from a cohort of livestock. Based on a received data, the LM system 100 can evaluate past and/or new protocols of livestock management including animal selection for improving and/or maintaining a rate and/or quality of production of bioproduct, improving and/or maintaining a quality of health of animals and/or their offspring, improving and/or maintaining a property of the bioproduct obtained, feed selection, medicine selection, bioproduct analysis, resource allocation, and/or the like, according to an embodiment. The LM system 100 includes compute devices 101, 102, and 103, connected to a livestock management device 105 (also referred to as "the device") through a communications network 106, as illustrated in FIG. 1. While the LM system 100 is illustrated to include three compute devices 101-103, a similar LM system can include any number of compute devices.

In some embodiments, the communication network 106 (also referred to as "the network") can be any suitable communications network for transferring data, operating over public and/or private networks. For example the network 106 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, the communication network 106 can be a wireless network such as, for example, a Wi-Fi or wireless local area network ("WLAN"), a wireless wide area network ("WWAN"), and/or a cellular network. In other instances, the communication network 106 can be a wired network such as, for example, an Ethernet network, a digital subscription line ("DSL") network, a broadband network, and/or a fiber-optic network. In some instances, the network can use Application Programming Interfaces (APIs) and/or data interchange formats, (e.g., Representational State Transfer (REST), JavaScript Object Notation (JSON), Extensible Markup Language (XML), Simple Object Access Protocol (SOAP), and/or Java Message Service (JMS)). The communications sent via the network 106 can be encrypted or unencrypted. In some instances, the communication network 106 can include multiple networks or subnetworks operatively coupled to one another by, for example, network bridges, routers, switches, gateways and/or the like (not shown).

The compute devices 101, 102, and 103 in the LM system 100 can each be any suitable hardware-based computing device and/or a multimedia device, such as, for example, a device, a desktop compute device, a smartphone, a tablet, a wearable device, a laptop and/or the like.

Figure 2:
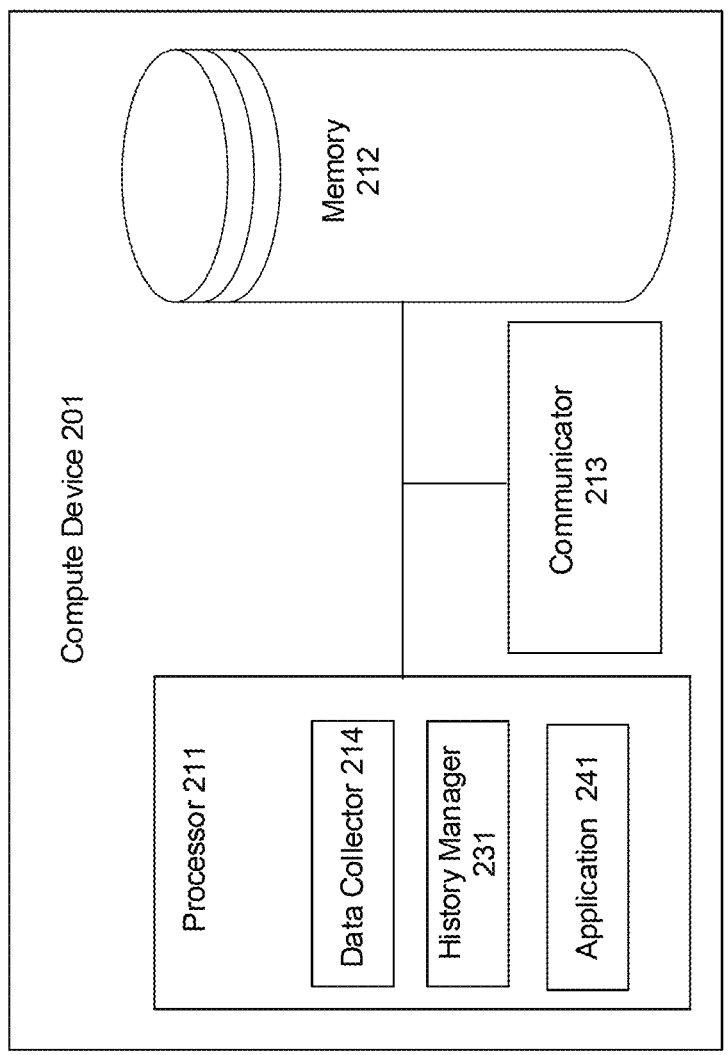
FIG. 2 is a schematic representation of a compute device included in an automatic livestock management system, according to an embodiment.

FIG. 2 is a schematic block diagram of an example compute device 201 that can be a part of an LM system such as the LM system 100 described above with reference FIG. 1, according to an embodiment. The compute device 201 can be structurally and functionally similar to the compute devices 101-103 of the system 100 illustrated in FIG. 1. The compute device 201 can be a hardware-based computing device and/or a multimedia device, such as, for example, a device, a desktop compute device, a smartphone, a tablet, a wearable device, a laptop and/or the like. The compute device 201 includes a processor 211, a memory 212 (e.g., including data storage), and a communicator 213.

The processor 211 can be, for example, a hardware based integrated circuit (IC) or any other suitable processing device configured to run and/or execute a set of instructions or code. For example, the processor 211 can be a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor 211 can be operatively coupled to the memory 212 through a system bus (for example, address bus, data bus and/or control bus).

The processor 211 can be configured to collect, record, log, document, and/or journal data associated with health (e.g., health associated with lactation, reproduction, feed consumption, etc) and/or a quantity/quality of a bioproduct produced by animals of a cohort of a managed livestock. In some instances, the compute device 201 can be associated with a farmer, a veterinarian, animal handling personnel, and/or the like who collect/log data associated with a health of animals or data associated with a bioproduct produced by the animals. In some instances, the compute device 201 can be associated with an entity providing analytical services to analyze the contents of samples. For example, the compute device can be associated with an analytical service provider configured to analyze the contents of milk produced by a cohort of managed livestock.

The processor 211 can include a data collector 214. The processor can optionally include the history manager 231, and application 241. In some embodiments, the data collector 214, the data history manager 231 and/or the application 241 can include a process, program, utility, or a part of a computer's operating system, in the form of code that can be stored in memory 212 and executed by the processor 211.

In some embodiments, each of the data collector 214, the history manager 231, and/or the application 241 can be software stored in the memory 212 and executed by processor 211. For example, each of the above-mentioned portions of the processor 211 can be code to cause the processor 211 to execute the data collector 214, the history manager 231, and/or the software application 241. The code can be stored in the memory 212 and/or a hardware-based device such as, for example, an ASIC, an FPGA, a CPLD, a PLA, a PLC and/or the like. In other embodiments, each of the data collector 214, the history manager 231, and/or the application 241 can be hardware configured to perform the specific respective functions.

The data collector 214 can be configured to run as a background process and collect or log data related to cohorts of animals in a managed livestock. In some instances, the data can be logged by personnel via the application 241 in the compute device 201. In some instances, the data can be automatically logged by sensors associated with the compute device 201 (not shown in FIG. 2). The sensors may be operated via the application 241 in the compute device 201. The sensors can be configured to automatically log data at specified time points or intervals and the data can be recorded by the data collector 214. As an example, an animal handling system in a farm can include an automatic health analysis sensor that measures and records health indicator values associated with an animal (e.g., weight, temperature, heart rate, blood pressure, etc.). As another example, an animal handling system in a farm can include an automatic content analysis sensor that is associated with a bioproduct collection system (e.g., a milk collection system). The content analysis sensor can be configured to automatically measure values (e.g. temperature, pH, weight, volume, density, relative and/or absolute fat/protein/dry extract content, etc.). In some implementations, the content analysis sensor can be configured to automatically measure values associated with any suitable bodily secretion of an animal (e.g., sweat, urine, saliva, etc.)

The data collector 214 can monitor, collect, track, and/or store data or information related to health status data, lactation status, reproductive status, number and/or state of progeny, feed selection or feed blend data, feed schedule data applied to a livestock, data related to a quantity and/or quality of bioproducts produced, medicinal treatments and/or dietary supplements recommended and/or used, data associated with targeted rate of production, quantity, and/or quality of bioproduct, target property associated with health and/or target measure of waste of resources, and/or the like.

In some instances, the data collector 214 can store the information collected in any suitable form such as, for example, in the form of text-based narrative of events, tabulated sequence of events, data from sensors, and/or the like. In some instances, the data collector 214 can also analyze the data collected and store the results of the analysis in any suitable form such as, for example, in the form of event logs, or look-up tables, etc. The data collected by the data collector 214 and/or the results of analyses can be stored for any suitable period of time in the memory 212. In some instances, the data collector 214 can be further configured to send the collected and/or analyzed data, via the communicator 213, to a device that may be part of an LM system to which the compute device 201 is connected (e.g., the LM device 105 of the system 100 illustrated in FIG. 1). In some instances, the data collector 214 can be configured to send the collected and/or analyzed data automatically (e.g., at specified time points, or periodically with a predetermined frequency of communication), in response to receiving an instruction from a user to send the analyzed data, and/or in response to a query from the LM device for the analyzed data.

In some embodiments, the history manager 231 of the processor 211 can be configured to maintain logs or schedules associated with a history of handling or management of animals in a cohort of livestock, the quantity/quality of feed, medicinal treatment, dietary supplement provided, etc. that may have been provided, health status of animals, a bioproduct producing property associated with health status of animals, data associated with quality and quantity of bioproduct, data associated with a number, frequency, and/or quality of progeny, the costs associated with the maintenance of the cohort of animals, and/or the like. The history manager 231 can also be configured to maintain a log of information related to the sequence of events (e.g., interventions provided to animals) and/or a concurrent set of data logged indicating health, reproduction, and/or production of bioproducts by the animals.

The memory 212 of the compute device 201 can be, for example, a random-access memory (RAM), a memory buffer, a hard drive, a read-only memory (ROM), an erasable programmable read-only memory (EPROM), and/or the like. The memory 212 can be configured to store any data collected by the data collector 214, or data processed by the history manager 231, and/or the application 241. In some instances, the memory 212 can store, for example, one or more software programs and/or code that can include instructions to cause the processor 211 to perform one or more processes, functions, and/or the like (e.g., the data collector 214, the history manager 231 and/or the application 241). In some embodiments, the memory 212 can include extendable storage units that can be added and used incrementally. In some implementations, the memory 212 can be a portable memory (for example, a flash drive, a portable hard disk, and/or the like) that can be operatively coupled to the processor 211. In some instances, the memory can be remotely operatively coupled with the compute device. For example, a remote database device can serve as a memory and be operatively coupled to the compute device.

The communicator 213 can be a hardware device operatively coupled to the processor 211 and memory 212 and/or software stored in the memory 212 executed by the processor 211. The communicator 213 can be, for example, a network interface card (NIC), a Wi-Fi™ module, a Bluetooth® module and/or any other suitable wired and/or wireless communication device. Furthermore, the communicator 213 can include a switch, a router, a hub and/or any other network device. The communicator 213 can be configured to connect the compute device 201 to a communication network (such as the communication network 106 shown in FIG. 1). In some instances, the communicator 213 can be configured to connect to a communication network such as, for example, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof.

In some instances, the communicator 213 can facilitate receiving and/or transmitting data or files through a communication network (e.g., the communication network 106 in the LM system 100 of FIG. 1). In some instances, received data and/or a received file can be processed by the processor 211 and/or stored in the memory 212 as described in further detail herein. In some instances, as described previously, the communicator 213 can be configured to send data collected and/or processed by the data collector 214 and/or history manager 231 to a device of an LM system (e.g., LM device 105) to which the compute device 201 is connected.

Figure 3:
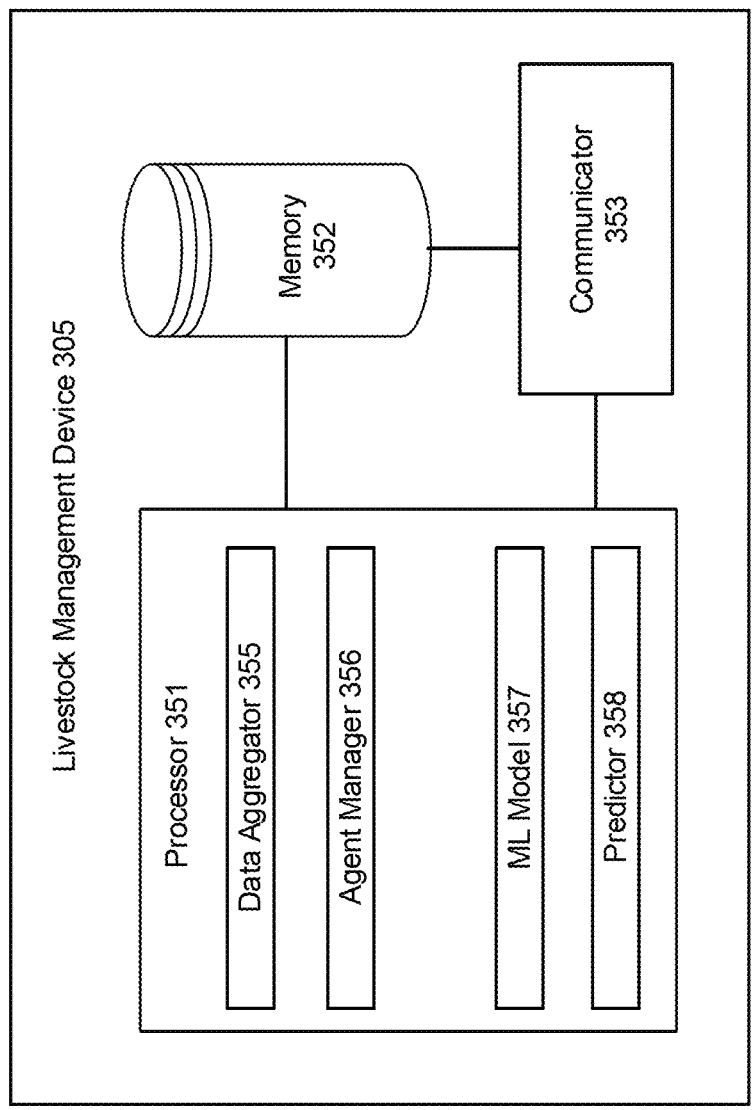
FIG. 3 is a schematic representation of a livestock management device included in an automatic livestock management system, according to an embodiment.

Returning to FIG. 1, the compute devices 101-103 that are connected to LM system 100 can be configured to communicate with an LM device 105 via the communication network 106. FIG. 3 is a schematic representation of an LM device 305 that is part of an LM system. The LM device 305 can be structurally and/or functionally similar to the LM device 105 of the system 100 illustrated in FIG. 1. The LM device 305 includes a communicator 353, a memory 352, and a processor 351.

Similar to the communicator 213 within compute device 201 of FIG. 2, the communicator 353 of the LM device 305 can be a hardware device operatively coupled to the processor 351 and the memory 352 and/or software stored in the device memory 352 executed by the processor 351. The communicator 353 can be, for example, a network interface card (NIC), a Wi-Fi™ module, a Bluetooth® module and/or any other suitable wired and/or wireless communication device. Furthermore, the communicator 353 can include a switch, a router, a hub and/or any other network device. The communicator 353 can be configured to connect the LM device 305 to a communication network (such as the communication network 106 shown in FIG. 1). In some instances, the communicator 353 can be configured to connect to a communication network such as, for example, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof.

The memory 352 of the LM device 305 can be a random-access memory (RAM), a memory buffer, a hard drive, a read-only memory (ROM), an erasable programmable read-only memory (EPROM), and/or the like. The device memory 352 can store, for example, one or more software modules and/or code that can include instructions to cause the device processor 351 to perform one or more processes, functions, and/or the like. In some implementations, the device memory 352 can be a portable memory (e.g., a flash drive, a portable hard disk, and/or the like) that can be operatively coupled to the device processor 351. In some instances, the device memory can be remotely operatively coupled with the device. For example, the device memory can be a remote database device operatively coupled to the device and its components and/or modules.

The processor 351 can be a hardware based integrated circuit (IC) or any other suitable processing device configured to run and/or execute a set of instructions or code. For example, the processor 351 can be a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor 351 is operatively coupled to the memory 352 through a system bus (e.g., address bus, data bus and/or control bus). The processor 351 is operatively coupled with the communicator 353 through a suitable connection or device as described in further detail.

The processor 352 can be configured to include and/or execute several components, units and/or instructions that may be configured to perform several functions, as described in further detail herein. The components can be hardware-based components (e.g., an integrated circuit (IC) or any other suitable processing device configured to run and/or execute a set of instructions or code) or software-based components (executed by the processor 352), or a combination of the two. As illustrated in FIG. 3, the processor 351 includes a data aggregator 355, an agent manager 356, an ML model 357, and a predictor 358.

The data aggregator 355 in the processor 351 can be configured to receive communications between the device 305 and compute devices connected to the device 305 through suitable communication networks (e.g., compute devices 101-103 connected to the device 105 via the communication network 106 in the system 100 in FIG. 1). The data aggregator 355 is configured to receive, from the compute devices, information collected and/or generated by the one or more data collectors in the compute devices (e.g., data collector 214 of compute device 201 shown and described with respect to FIG. 2). The data from data collectors of various compute devices can, in some instances, include one or more logs or records or other data relating to animal handling of a managed livestock, feed schedule associated with individual animals, health status, bioproduct producing status, reproductive status, and/or progeny associated with individual animals, recommendations of feed, medicinal treatment and/or dietary supplement for individual animals, schedules of medicinal treatments and/or dietary supplements provided to individual animals, productions of bioproducts by individual animals, history of bioproduct producing status or phases in production cycle, history of production of bioproducts including measures of a quantity and/or quality of bioproducts, an indication of properties of a bioproduct that may be of interest (e.g., a measure of protein content of milk that is of interest to customers who are manufacturers of milk products), history of reproductive status, number of pregnancies/live births associated with a reproductive history of an animal, a measure of costs associated with maintenance of livestock, and/or the like. In some instances, the bioproducts can be intended for various end uses that can aid in deciding a target production rate and/or number/type of clients to be served or a number of producing animals to be maintained in a cohort of livestock. For example, animals producing milk can be raised to maintain a target production quality and rate or target health to ensure production of a target quantity and/or quality of milk to meet a variety of end uses that includes, for example, drinking milk, milk used to produce cheese, milk used to produce butter, milk used to produce yogurt, milk used to produce ice cream, milk used in baking, etc. As another example, poultry producing eggs can be raised to maintain a target production rate or target health to ensure a periodic (e.g., daily) production of a target quantity and/or quality of eggs to meet a variety of end uses that includes baking, cooking, eggs used in specific diets (e.g., ketogenic diet, paleo diet, Atkins diet, etc.), etc. Any other suitable examples of animals can be raised to meet and/or maintain a target production rate and/or quality to meet a production of bioproducts including wool or any other suitable fiber derived from animals, honey derived from bees raised in intensely managed bee colonies, etc.

The data aggregator 355 is further configured to receive data associated with history managers in the compute devices (e.g., history manager 231 on compute device 201 in FIG. 2). The data associated with history manager 231 can include information associated with a history of handling, bioproduct production, reproduction, management, and/or a yield of bioproduct of animals in a cohort of livestock. The data associated with history manager 231 can include a quantity/quality of feed, medicinal treatment, and/or dietary supplement provided, a state of health, a property associated with a health status, quantity/quality of bioproducts produced, the costs associated with the maintenance of the cohort of animals, and/or the like. In some instances, the data aggregator 355 can be configured to receive a record of information related to a sequence of events (e.g., a schedule of interventions like changes in feed blend, medicinal treatments, or dietary supplements provided to individual animals) and/or a concurrent set of data logged indicating a health status, a property associated with a health status, and/or a production of bioproducts by the animals. In some implementations, the data aggregator 355 can receive the information sent by the compute devices at one or more specified time points or intervals. In some implementations, the data aggregator 355 can be configured to query the compute devices at one or more specified time points or time intervals to receive the data or information in response to the query. In some implementations, the data aggregator 355 can be configured to send queries and/or receive data/information from compute devices automatically and/or in response to a user generated action (e.g., user activated transmission of a query via a software user interface). In some instances, the data aggregator 355 can be further configured to receive, from farmers and/or animal handling personnel, data associated with day-to-day or regular handling of animals in a managed livestock. The data can include an identification associated with animals, feed, current health indications (age, weight, etc.), health status, properties associated with a health status (e.g. a reproductive state or a state in a life/growth/production cycle of an animal, a birth, a prenatal or a postnatal state of an animal, number, health and/or quality of progeny), a schedule of medicinal treatments provided, a schedule of feed selections/feed blends provided, a schedule of dietary supplements provided, a duration, intervals, quantity/dosage of feed/medicine/dietary supplement, quality of feed/medicine/supplement and/or the like.

In some instances, the data aggregator 355 can be further configured to receive, analyze, and/or store communications from compute devices regarding any suitable information related to livestock management, health status of animals in a livestock, property associated with health of animals, recommendations of feed blend, medicinal treatments or dietary supplements to be provided. The data aggregator 355 can receive, analyze, and/or store information associated with target aspects related to management of the livestock, including a target property of a cohort of animals (e.g., target average rate of production or target average health), a target reduced measure of production loss or loss of resources, a target number/quality of animals and/or a target quantity/quality of bioproducts produced by animals, a target quantity/quality of bioproducts to meet an end use, and/or the like. The information received from a compute device can include, for example, one or more threshold values related to a target property associated with a health status of a livestock, a quantity/quality associated with health status of animals, a quantity/quality associated with a bioproduct produced by animals (e.g., milk, eggs, honey, fiber, etc.), a desired quantity/quality of bioproduct and/or a desired reproductive rate associated with animals intended to produce a bioproduct for an intended end use, one or more threshold values of one or more properties associated with quality of the bioproduct content, and/or the like. The data aggregator 355, in some instances, can also be configured to receive analytical reports based on analysis of bioproduct samples from a specified cohort of animals. In some instances, the data aggregator 355 can receive results from analysis of bioproducts (e.g., milk) and/or samples obtained from animals (e.g., sweat, urine, saliva, etc.), the results including an indication of one or more measures of animal health status including: urea, bacteria count, inhibitors, casein, and somatic cell count with protein and dry extract values etc.

The data aggregator 355, in some instances, can also be configured to receive information from animal health experts such as veterinarians including reports on the current health status of specified animals in a managed livestock. In some instances, the information can include a recommendation of feed selection, feed blend, medicinal treatment and/or dietary supplements to be provided to the animals based on the analysis of the current health status of the animals and/or a current measure of a property associated with an animal. A health status can include data related to a quantity/quality of bioproduct produced by an animal. For example, an indication of health status can include an indication of protein leaked in from being absorbed by the animals, for example protein leaked in the form of urea. In some instances, the indication of health status can include an amount of fat in milk, an amount of protein in milk, a number of days producing milk, an average rate of milk production, an amount of dry extract in milk, a number of liters of milk per day, an amount of urea in milk, a bacteria count in milk, inhibitors in milk, an amount of casein in milk, or an amount of somatic cells in milk. In some instances, one or more of the above listed information can serve as an indication of bioproduct quality.

As an example, in some instances, a particular animal in a cohort of animals producing milk, can be identified, based on analysis of a current health status, and/or of properties associated with the bioproduct obtained from that particular animal, to be at a first state in a production cycle or a health status. Based on the identification, a schedule of feed selection, medicinal treatment and/or dietary can be provided which can be received by the data aggregator 355. In some instances, the information can include a recommendation of feed and/or medicinal blend to be adaptively provided to animals based on a desired balance between or a collective improvement of two or more variables. The variable can include a target property associated with a health of a cohort of livestock, a target property of a bioproduct to be obtained from the animals, and/or a health status of the animals. In some instances, the information can include a tracked schedule of feed blends, medicinal treatments and/or dietary supplements applied/administered to an animal in a cohort of livestock and a set of associated results or changes in health status in response to or concurrent with or following the application or administration of feed blends, medicinal treatments and/or dietary supplements, which can be received by the data aggregator 355.

The processor 351 includes an agent manager 356 that can be configured to generate and/or manage one or more agents configured to interact in an environment and/or implement machine learning. An agent can refer to an autonomous entity that performs actions in an environment or world that is modeled or set up according to a set of states or conditions and configured to react or respond to agent actions. An environment or world can be defined as a state/action space that an agent can perceive, act in, and receive a reward signal regarding the quality of its action in a cyclical manner (illustrated in FIG. 5). An LM system can define a dictionary of agents including definitions of characteristics of agents, their capabilities, expected behavior, parameters and/or hyperparameters controlling agent behaviors, etc. An LM system can define a dictionary of actions available to agents. In some implementations the actions available to an agent can depend and/or vary based on the environment or world in which the agent acts. As an example a world can be modeled using parameters associated with a number and quality of animals in a livestock, health status of each animal, a property associated with health status of each animal, a quantity/quality of bioproduct produced by each animal, etc. and can use reward signals derived based on a set of tasks that include for example to optimize a balance between health status and bioproduct produced by a cohort of animals, or to optimize/maintain a health status of a cohort of animals. In some implementations, an agent manager 356 can use animal health measures obtained from analysis of samples of bioproducts and/or secretions obtained from animals to define reward signals. For example, animal health measures including: urea, bacteria count, inhibitors, casein and somatic cell count with protein, and dry extract values as reward signals. In some instances, reward signals can include a measure of leaked protein associated with a group of animals, a measure of production loss indicated by a health status (e.g., measures obtained using analysis of bodily fluids, or analysis of samples obtained from animals, or analysis of health indicators obtained from animals) in one or more animals, a measure of quality of bioproducts produced by animals. For example, reward signals can include an amount of protein in milk or an amount of urea and/or dry extract in milk produced by one or more animals.

In some implementations, an environment or world can be defined to include state/action pairs associated with assignment of livestock to groups, providing or administering feeds or feed blends of animals in groups of livestock, obtaining data from individual animals indicating health status and/or a reproductive property associated with health status, obtaining bioproducts from animals in the groups, analyzing the contents of bioproducts produced by individual animals in a group, providing recommendations of schedules including a selection of feed blend/medicinal treatment/dietary supplement to individual animals in a group, administering feed blend/medicinal treatment/dietary supplement to individual animals in a group, responding to unexpected turns in health status and/or change in quantity or quality of bioproduct, and/or the like. Through this cyclical interaction, agents can be configured to learn to automatically interact within a world intelligently without the need of a controller (e.g., a programmer) defining every action sequence that the agent takes.

In an example implementation, agent-world interactions can include the following steps. An agent observes an input state. An action is determined by a decision-making function or policy (which can be implemented by an ML model 358). The action is performed. The agent receives a reward or reinforcement from the environment in response to the action being performed. Information about the reward given for that state/action pair is recorded. The agent can be configured to learn based on the recorded history of state/action pair and the associated reward. Each state/action pair can be associated with a value using a value function under a specific policy. Value functions can be state-action pair functions that estimate how favorable a particular action can be at a given state, or what the return for that action is expected to be. In some implementations, the value of a state (s) under a policy (p) can be designated $V^p(s)$. A value of taking an action (a) when at state (s) under the policy (p) can be designated $Q^p(s,a)$. The goal of the LM device 305 can then be estimating these value functions for a particular policy. The estimated value functions can then be used to determine sequences of actions that can be chosen in an effective and/or accurate manner such that each action is chosen to provide an outcome that improves and/or maximizes total reward possible, after being at a given state.

As an example, the agent manager 356 can define a virtualized environment that includes the virtualized management of a specified cohort of virtualized animals of a managed livestock (e.g., goats). The virtualized environment can be developed using data aggregated by the data aggregator 355.

The managed livestock can be raised to produce a specified bioproduct (e.g., milk). The agent manager 356 can define agents that perform actions that simulate events in the real world that may impact the management of the cohort of animals of the managed livestock. For example, the agent manager 356 can define actions that can simulate providing a specified feed blend to individual animals in a cohort of animals, providing a medicinal treatment and/or a dietary supplement to individual animals in the cohort of animals, measuring a health status and/or a property associated health status of each animal in the cohort of animals, achieving a desired target of collectively improving a health status and a quality of bioproduct, or reaching a target property and/or health status associated with each animal in the cohort of animals, obtaining a production of a specified quantity and/or quality of a bioproduct (e.g., a volume of milk, a measured value of a protein content in milk, and/or the like), etc.

In some implementations, each agent can be associated with a state from a set of states that the agent can assume. For example, a set of state values that indicate that the somatic cell and urea counts have increased can indicate that the animals are experiencing health issues because the reward value has decreased. Such an indication can cause the agent to change the feed or select medicinal treatment to be applied. As another example, a sequence of states that indicate that the milk protein value is decreasing can result in or cause an agent to change the feed or select medicinal treatment to be applied. Each agent can be configured to perform an action from a set of actions. The agent manager 356 can be configured to mediate an agent to perform an action, the result of which transitions the agent from a first state to a second state. In some instances, a transition of an agent from a first state to a second state can be associated with a reward. For example, an action of providing a dietary and/or medicinal supplement can result in a reward in the form of an increase in a protein content associated a milk produced by a cohort of animals of livestock. The actions of an agent can be directed towards achieving specified goals. An example goal can be collectively improving a health status and a bioproduct quality of an animals of a cohort of animals. For example, a cohort of animals may be identified to have protein from their feed being leaked out in the form of urea, resulting in lesser than expected or targeted protein content in the bioproduct. A goal may be to reduce production loss by minimizing wasted protein by adaptively switching the feed blends provided to the cohort of animals. A goal may include maximizing and/or increasing rewards in an environment. For example, a goal can be defined to achieve a specified increase in a production rate associated with a cohort of goats raised to produce milk within a specified duration of time. The actions of agents can be defined based on observations of states of the environment obtained through data aggregated by the data aggregator 356 from compute devices or sources related to the environment (e.g., from sensors). In some instances, the actions of the agents can inform actions to be performed via actors (e.g., human or machine actors or actuators). In some instances, the agent manager 356 can generate and/or maintain several agents. The agents can be included in groups defined by specified goals. In some instances, the agent manager 356 can be configured to maintain a hierarchy of agents that includes agents defined to perform specified tasks and sub-agents under control of some of the agents.

In some instances, agent manager 356 can mediate and/or control agents to be configured to learn from past actions to modify future behavior. In some implementations, the agent manager 356 can mediate and/or control agents to learn by implementing principles of reinforcement learning. For example, the agents can be directed to perform actions, receive indications of rewards and associate the rewards to the performed actions. Such agents can then modify and/or retain specific actions based on the rewards that are associated with each action, to achieve a specified goal by a process directed to increase the number of rewards. In some instances, such agents can operate in what is initially an unknown environment and can become more knowledgeable and/or competent in acting in that environment with time and experience. In some implementations, agents can be configured to learn and/or use knowledge to modify actions to achieve specified goals.

In some embodiments, the agent manager 356 can configure the agents to learn to update or modify actions based on implementation of one or more machine learning models. In some embodiments, the agent manager 356 can configure the agents to learn to update or modify actions based on principles of reinforcement learning. In some such embodiments, the agents can be configured to update and/or modify actions based on a reinforcement learning algorithm implemented by the ML model 357, described in further detail herein.

In some implementations, the agent manager 356 can generate, based on data obtained from the data aggregator 355, a set of input vectors that can be provided to the ML model 357 to generate an output that determines an action of an agent. In some implementations, the agent manager 356 can generate input vectors based on inputs obtained by the data aggregator 355 including data received from compute devices and/or other sources associated with a managed livestock (e.g., sensors). In some implementations, the agent manager 356 can generate the input vectors based on a target balance between a property associated with a bioproduct produced by a livestock, health status of an animal in the livestock and a cost associated with management of the livestock. In some instances, the input vectors can be generated to reach and/or maintain a specific level of health status. In some instances, the input vectors can be generated to reach a goal of minimized and/or reduced loss of resources while achieving a target quantity/quality of a property associated with a bioproduct produced by an animal in a livestock. For example, the data aggregator 355 can receive data from a first compute device associated with a farmer managing a livestock producing a bioproduct (e.g., milk). The data can include a target health status or production property. For example, the data can include a desired rate of production, a desired quality of bioproduct, a desired indication of lack of loss in content (lack of leak in protein), a desired cost associated with management of animals in the livestock, and/or other parameters associated with a health status of individual animals in a livestock. In some instances, the data can include a target indicator of bioproduct quality, for example, a target high level of a property (e.g., protein content) of the bioproduct (e.g., milk). In some instances, the data can include a target indicator of health status, for example, a target low level of a wasted resources (e.g., leaked protein content) in the waste generated by animals (e.g., in the form of urea). Health status can include multiple specified threshold values that can be used to evaluate multiple health indicators. Multiple health indicators can be used at a time to indicate a health status. Health indicators can include weight, temperature, heart rate, blood pressure, etc. In some instances, one or more health indicators can be weighted according to a preference defined by a user and/or the LM system (e.g., the ML model 357).

The indication can include a threshold value associated with bioproduct quality and/or the indicator associated with measure of wasted resources. In some implementations, the agent manager 356 can receive the inputs obtained by the data aggregator 355 including the indication of the target bioproduct property, a target health status of the animals (e.g., a target low amount of waste resource that the management of animals should incur), a current health status of the animals, and generate input vectors to be provided to the ML model 357 to generate an output.

The ML model 357, according to some embodiments, can employ an ML algorithm to optimize a selection of schedules, feeds and/or medicines that can be used to obtain a desired health status of individual animals, a desired reduction in waste of resources, a desired property associated with a health status of animals in a livestock, a desired quality of bioproduct, and/or a cost associated with maintenance of a cohort of animals producing a bioproduct according to desired criteria. In some instances, for example, the ML model 357 can represent or simulate a virtualized world using various properties of the bioproduct (e.g., milk) and animal health (e.g., instances of leaked resources, illness, longevity, reproduction, etc.) and can use reward signals derived based on tasks defined to achieve target results such as a target health status of animals that produce a bioproduct, a target reduction in leaked resources, a target improvement in property associated with the health status of individual animals, and/or a cohort of animals that produce a bioproduct, target number and quality of animals that produce a bioproduct, a target production by and/or health maintenance of the animals. In some embodiments, the ML model 357 can include components that implement livestock feed scheduling and/or management, medicinal treatment scheduling and/or management, dietary supplement scheduling and/or management, etc.

In some instances, the ML model 357 can implement a reinforcement learning algorithm to determine action that can be undertaken by agents in a virtualized environment to arrive at predictions of indications of a selection of feed blends, feed schedules, and/or medicines to increase a probability or likelihood of achieving a specified goal. The goal can be a specific target reduction in production loss (e.g., in the form of leaked resources) or a target property associated with a health status and/or bioproduct of an animal in a livestock, (e.g., a target increase in protein content in the milk and/or a reduction in urea in the milk produced by the animal) in a cohort of animals that produce bioproduct that meets a desired quality criteria determined based on an end use.

The ML model 357 can be configured such that it receives input vectors and generates an output based on the input vectors, the output including an indication of a feed blend, medicine, supplements, schedule, and/or a feed selection that can increase the likelihood of meeting the target reduction in production loss, the target bioproduct quality, and/or target property associated with the health status of animals in a livestock. In some instances, the ML model 357 can be configured to generate an output indicating a feed schedule or feed blend that puts the animals producing a bioproduct on a trajectory to achieve the desired target bioproduct quality and/or target health status within a specific time period. In some implementations, the ML model 357 can be configured to generate an output indicating a schedule to be adopted, to meet a target bioproduct quality and/or a target property associated with health status by a specific time point. In some implementations, the ML model 357 can be configured to account for a duration that the animals have to be on a particular feed schedule to achieve the desired health status and/or desired bioproduct quality. The ML model 357 can be implemented using any suitable model (e.g., a statistical model, a mathematical model, a neural network model, and/or the like). The ML model 357 can be configured to receive inputs and based on the inputs generate outputs.

In some implementations, the ML model 357 can receive inputs related to a current health status of a cohort of identified animals of a managed livestock (e.g., current health status of a selected group of goats) and agents can perform actions proposed by the agent manager 356 based on one or more outputs of a machine learning (ML) model such as the ML model 357. In some implementations, the ML model 357 can be configured to model and/or implement the environment, agents, and interactions between the agents and the environment. The ML model 357 can be configured to implement agents, their actions, and/or state transitions associated with the agents and actions. In some implementations, the ML model 357 can be configured to receive inputs based on information related to health status, production status, bioproduct quality, amount of loss in production, measures of waste of resources, and/or yield of bioproduct from animals in the managed livestock and use the inputs to implement rewards in response to agent actions. For example, the inputs can include an indication of a change in health status (e.g., an illness or an improvement from illness), or change in a bioproduct quality (e.g., an increase or decrease in leaked resources), or a change in a property associated with health status (e.g., a change in lactation cycle, etc.) or a change in a property of bioproduct (e.g., an increase in protein content).

The ML model 357 can implement any suitable form of learning such as supervised learning, unsupervised learning and/or reinforcement learning. The ML model 357 can be implemented using any suitable modeling tools including statistical models, mathematical models, decision trees, random forests, neural networks, etc. In some embodiments, the ML model 357 can implement one or more learning algorithms. Some example learning algorithms that can be implemented by the ML model can include Markov Decision Processes (MDPs), Temporal Difference (TD) Learning, Advantage Actor-Critic (A2C), Asynchronous Advantage Actor-Critic (A3C), Deep Q Networks (DQNs), Deep Deterministic Policy Gradient (DDPG), Evolution Strategies (ES) and/or the like. The learning scheme implemented can be based on the specific application of the task. In some instances, the ML model 357 can implement Meta-Learning, Automated Machine Learning and/or Self-Learning systems based on the suitability to the task.

The ML model 357 can incorporate the occurrence of rewards and the associated inputs, outputs, agents, actions, states, and/or state transitions in the scheme of learning. The ML model 357 can be configured to implement learning rules or learning algorithms such that upon receiving inputs indicating a desired goal or trajectory that is similar or related to a goal or trajectory that was achieved or attempted to be achieved in the past, the ML model 357 can use the history of events including inputs, outputs, agents, actions, state transitions, and/or rewards to devise an efficient strategy based on past knowledge to arrive at the solution more effectively.

While an ML model 357 is shown as included in the LM device 405, in some embodiments, the ML model can be omitted and the LM device 405 can implement a model free reinforcement learning algorithm to implement agents and their actions.

In some implementations, the ML model 357 and/or the agent manager 356 can implement hierarchical learning (e.g., hierarchical reinforcement learning) using multiple agents undertaking multi-agent tasks to achieve a specified goal. For example, a task can be decomposed into sub-tasks and assigned to agents and/or sub-agents to be performed in a partially or completely independent and/or coordinated manner. In some implementations, the agents can be part of a hierarchy of agents and coordination skills among agents can be learned using joint actions at higher level(s) of the hierarchy.

In some implementations, the ML model 357 and/or the agent manager 356 can implement temporal abstractions in learning and developing strategies to accomplish a task towards a specified goal. Temporal abstractions can be abstract representations or generalizations of behaviors that are used to perform tasks or subtasks through creation and/or definition of action sequences that can be executed in new and/or novel contexts. Temporal abstractions can be implemented using any suitable strategy including an options framework, bottleneck option learning, hierarchies of abstract machines and/or MaxQ methods.

The processor 351 further includes a predictor 358 configured to receive outputs from the ML model 357 and based on the outputs make predictions that can be tested in the real world. For example, the predictor 358 can receive outputs of ML model 357 and generate a prediction of achieving a specified target goal defined by an aspect of animal handling or a value/improvement in an aspect of animal handling. Aspects can include a target health status, target bioproduct quality, a target reduction in production loss, and/or a target reduction/maintenance in costs associated with animal handling. In some embodiments, goals can include a target balance between two or more of these aspects and/or a collective improvement in two or more aspects. The predictor 358 can generate a prediction based on outputs of ML model 357 that a goal may be achieved within a specified duration of time following the implementation of a feed schedule and/or a feed selection based on the outputs of the ML model 357. In some implementations, the predictor 358 can receive outputs of ML model 357 and generate a prediction of a projected amount of time needed to administer the feed selection to the managed livestock for the managed livestock to meet a specified target health status, target bioproduct quality, a target reduction in loss of resources, and/or a target balance between these and/or similar aspects. In some implementations, the predictor 358 can receive outputs of ML model 357 and generate a prediction of a projected amount of time that the managed livestock should be fed using a recommend set of feed selections and/or feed schedules (for each animal) in a sustained manner or according to an indicated schedule for the individual animals and/or the managed livestock to meet a specified target bioproduct quality and/or health status.

In some implementations, the predictor 358 can provide several predictions that can be used to recommend, select and/or identify a strategy to be implemented in the real world. In some implementations, the predictor 358 can be configured to recommend a feeding schedule and/or an animal care schedule while accounting for a duration of time that an animal should adhere to that schedule to achieve the desired goal. The schedule can account for a number of animals to achieve a target bioproduct quality (e.g., protein in milk and/or reduction of urea in milk) to maintain a cohort of animals that produce a desired volume or quantity of bioproduct and/or bioproduct with a target quality for a customer's contract. In some instances, the output of the predictor 358 can be used to provide the farmer with an estimate of needs and costs to fulfill a customer's request. In some instances, the output of the predictor 358 can be used to determine profitability and quote estimation.

In use, the LM device 305 can receive inputs from one or more compute devices and/or remote sources using a data aggregator 355. The inputs can include information regarding health status, handling, and/or feeding schedule of animals producing a bioproduct such as milk, information associated with a current health status, current bioproduct quality, current measure of waste of resources, current yield (quantity/quality) of the bioproduct, indications of desired target health status, target bioproduct quality, target measure or reduction of waste or resources, target property associated with the health status, target quantities/qualities in a bioproduct, etc. The LM device 305 can implement virtualized agents acting within a virtualized world or environment, using an agent manager 356 and/or an ML model 357. In some implementations, the environment can be defined in a form of a Markov decision process. For example, the environment can be modeled to include a set of environment and/or agent states (S), a set of actions (A) of the agent, and a probability of transition at a discreet time point (t) from a first state (S1) to a second state (S2), the transition being associated with an action (a).

In some implementations, the agents and/or the world can be developed based on one or more inputs or modified by one or more user inputs. The LM device 305 can provide aggregated information to the ML model 357. In some embodiments, the agent(s) can be part of the ML model 357. In some embodiments, the ML model 357 can implement the environment in which the agent(s) are configured to act. In some instances, the LM device 305 can receive an indication of a change in health status, a change in property associated with health status, or a change in yield following an initiation of a feed schedule. The indication may include a positive change in a property associated with health status (e.g., a recovery from illness, a reduced measure of waste of resources, etc.) or a positive change in a yield of bioproduct in the direction of a desired trajectory. In some instances, the LM device 305 can receive an indication of a recommendation of feed blend/medicinal treatment/dietary supplement from a veterinarian or an animal health specialist. The recommendation can be closely aligned with a prior prediction or recommendation generated by the LM device 305. The LM device 305 can then provide the input associated with the positive change in the yield, and/or the indication of a recommendation from a veterinarian which is aligned with a recommendation of the LM device 305, in the form of a reward such that the ML model 357 can learn the positive association of a previously recommended strategy (e.g., feed blend, feed schedule, etc.) with external validation. In some implementations, the LM system 305 can predict or generate estimated rewards that can be used as predictions to be compared with reward signals received based on a state of a world or environment. The LM system 305 can be configured to learn and/or update the ML model 357 and/or the agent and its behavior based on a comparison between the estimated reward and an actual reward received from the world. Over time and/or over a course of implementation of the virtualized environment/agents, the LM device 305 can generate an output based on the information received. The output of the ML model 357 can be used by a predictor 358 to generate a prediction of an outcome or an event or a recommendation of an event to achieve a desired goal. In some instances, the LM device 305 can generate a prediction based on learning a dependency indicated by a recommendation of feed blend/medicinal treatment/dietary supplement from a specialist. For example the output of the predictor 358 based on the output of the ML model 357 can include a recommendation of a feed blend and/or a feed schedule that a cohort of animals can be provided with for a specified period to achieve a higher likelihood of meeting a collective improvement in bioproduct quality, health status, and/or target measure of waste of resources associated with one or more animals from a cohort of animals.

While the device 305 is described to have one each of a data aggregator, an agent manager, an ML model, and a predictor, in some embodiments, a device similar to the device 305 can be configured with several instances of the above mentioned units, components, and/or modules. For example, in some embodiments, the device may include several data aggregators associated with one or more compute devices or groups of compute devices. The device may include several agent managers generating and operating multiple agents as described in further detail herein. In some embodiments, the device may include several ML models and/or several predictors assigned to perform specified computations and/or predictions such as, for example, to predict a feed blend to most efficiently achieve a target health status, bioproduct quality, reduced measure of waste in resources, or to predict an estimated cost associated with a specified protocol of animal handling. In some embodiments, the ML models can predict a (reduced) measure of waste of resources expected to be incurred given a specified feed schedule and a given duration, predict a quantity/quality (e.g., values associated with properties) of a bioproduct given a specified feed schedule and a given duration, etc. In some embodiments, one or more of the components including a data aggregator, an agent manager, an ML model, and a predictor can be omitted and/or combined with another component to perform related functions.

Figure 4:
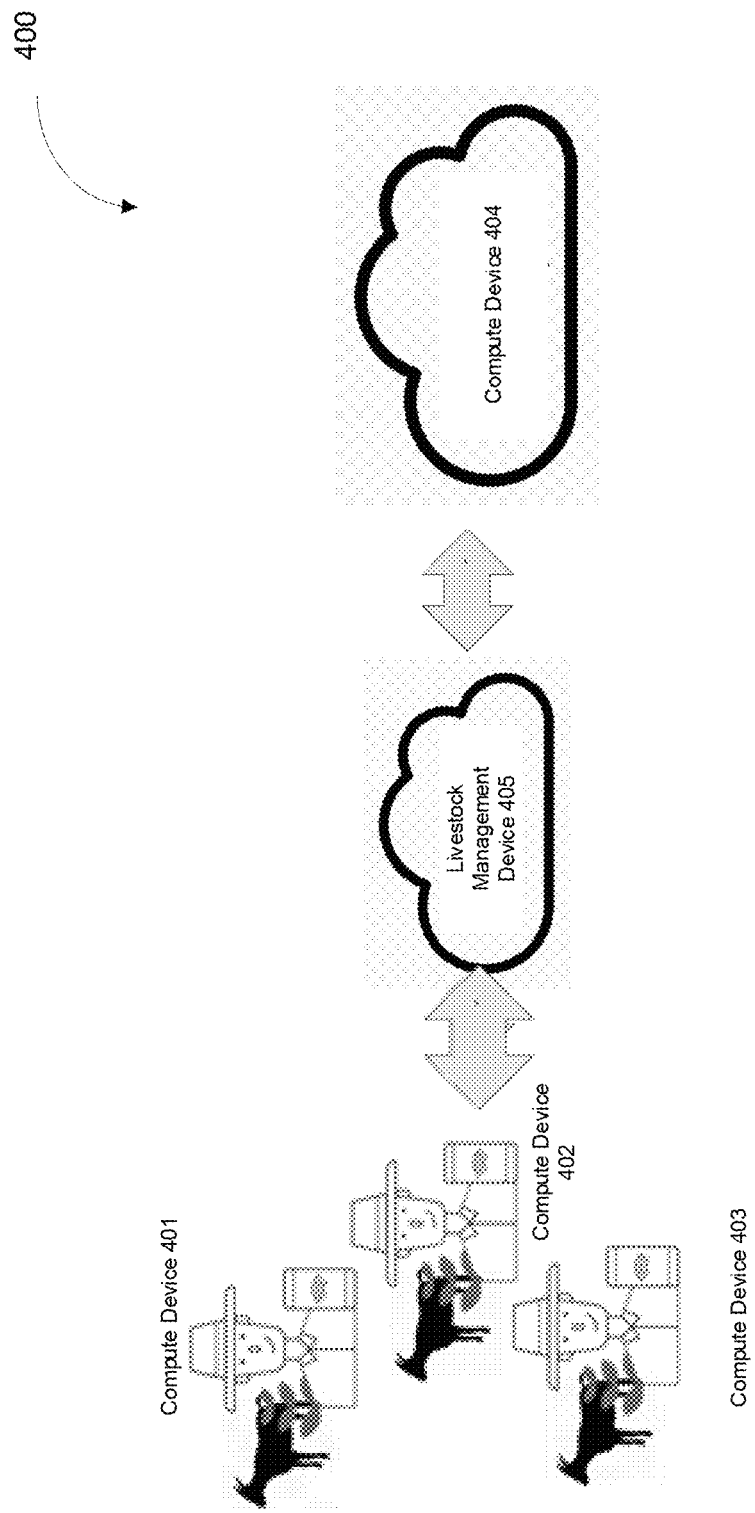
FIG. 4 is a schematic illustration of a flow of information within a livestock management system to collectively manage the health status of livestock managed by multiple clients and the bioproduct quality of the managed livestock, according to an embodiment.

FIG. 4 is an illustration of a flow of information in a LM system 400, according to an implementation. The LM system 400 can be substantially similar to the system 100 in structure and/or function. In the illustrated implementation, the LM system 400 can include a LM device 405, compute devices 401, 402, and 403 associated with farmers managing livestock including goats producing milk, and a compute device 404 associated with an animal's health specialist (e.g., veterinarian). The LM system 400 can include customers associated compute devices (not shown) that can be producers of products derived from milk (e.g., cheese products, yogurt-based products, etc.) or producers of milk.

The LM device 405 can receive inputs from the compute devices 401-403 providing data related to handling of animals and their upkeep. In some instances, the LM device 405 can receive input from the compute devices 401-403 indicating a target quality of bioproduct and/or a target property associated with health status that is desired by the farmers. The LM device 405 can receive any number of inputs. For example, the LM device 405 can receive additional inputs (not shown in FIG. 4) from other compute devices (not shown) indicating a target health status, reproductive property or property associated with production of a bioproduct (e.g., a target reproductive state of an individual animal, a target reproduction rate in a cohort of animals that is higher than a threshold, a target quantity/quality of bioproduct higher than a threshold, etc.) for example. The LM device 405 can be configured to generate a strategy to achieve the desired goals associated with each farmer. In some implementations, the LM system 400 can be configured to generate a cost estimate and/or a quote for sale of a specified or desired quantity of bioproduct i.e. milk with the desired target quality for each customer, and send information associated with the cost estimate to the respective compute devices 401-403.

The LM device 405 can send to and/or receive inputs from the compute device 404 associated with an animal health specialist (e.g., a veterinarian). In some implementations, the LM device 405 can send feeding data and/or other animal handling data (e.g., data received from compute device 406 associated with farmer) to the compute device 404. In some implementations, the LM system 405 can send an indication of a target health status, target reproductive property associated with health status, and/or a target quality of a property of bioproduct that is of interest (e.g., data received from compute devices 401-403 associated with farmers and/or end-use customers). In some implementations, the LM device 405 can receive from the compute device 404 associated with an animal health specialist an indication of a recommendation of feed schedule and/or feed blend to be provided to individual animals in a cohort. In some implementations, the LM device 405 can receive information and/or a recommendation related to medicinal treatments and/or dietary supplements to be provided to individual animals in a cohort to increase a likelihood of achieving a target health status and/or reproductive property. In some implementations, the LM device 405 can be configured to over time learn a pattern of information or recommendation and events associated with the information or recommendation provided by the compute device 404 associated with the animal health specialist such that the LM device 405 can provide inputs in place of and/or in addition to the information or recommendations from the animal health specialist.

The LM device can provide based on computations carried out and/or based on inputs received from the compute devices (e.g., devices 401, 402, 403, 404) and/or sources (not shown) a recommendation of feed, feed blend, medicinal treatment and/or dietary supplement to be provided to individual animals to achieve a specific target goal. In some instances, a medicine and/or a dietary supplement can be included in a feed blend or be a part of a feed schedule. In some instances, an LM system 400 can recommend aspects of animal health other than feeding. For example, an LM system 400 can recommend a schedule of animal handling including a schedule for exercise, a schedule for sleep, a schedule for light cycle, a schedule for temperature, a schedule for any other suitable activity or state, a schedule for sanitation/hygiene, and/or the like. In some implementations, the LM device 405 can send the feeding schedule and/or other animal handling schedule to the compute devices 401-403. In some implementations, the LM system 405 can send an indication of an estimated property of health status or an estimated reproductive property (e.g., estimated reproductive rate) that may be obtained at a specified period of time if the animals were maintained in a particular regimen of feed schedule and/or dietary supplement/medicinal treatment schedule. In some implementations, the LM system 405 can send an indication of an estimated cost associated with achieving a target population of animals and/or a target quantity/quality of a property of bioproduct that may be obtained at a specified period of time if the animals were maintained in a particular regimen of feed schedule and/or dietary/medicinal supplement schedule.

Figure 5:
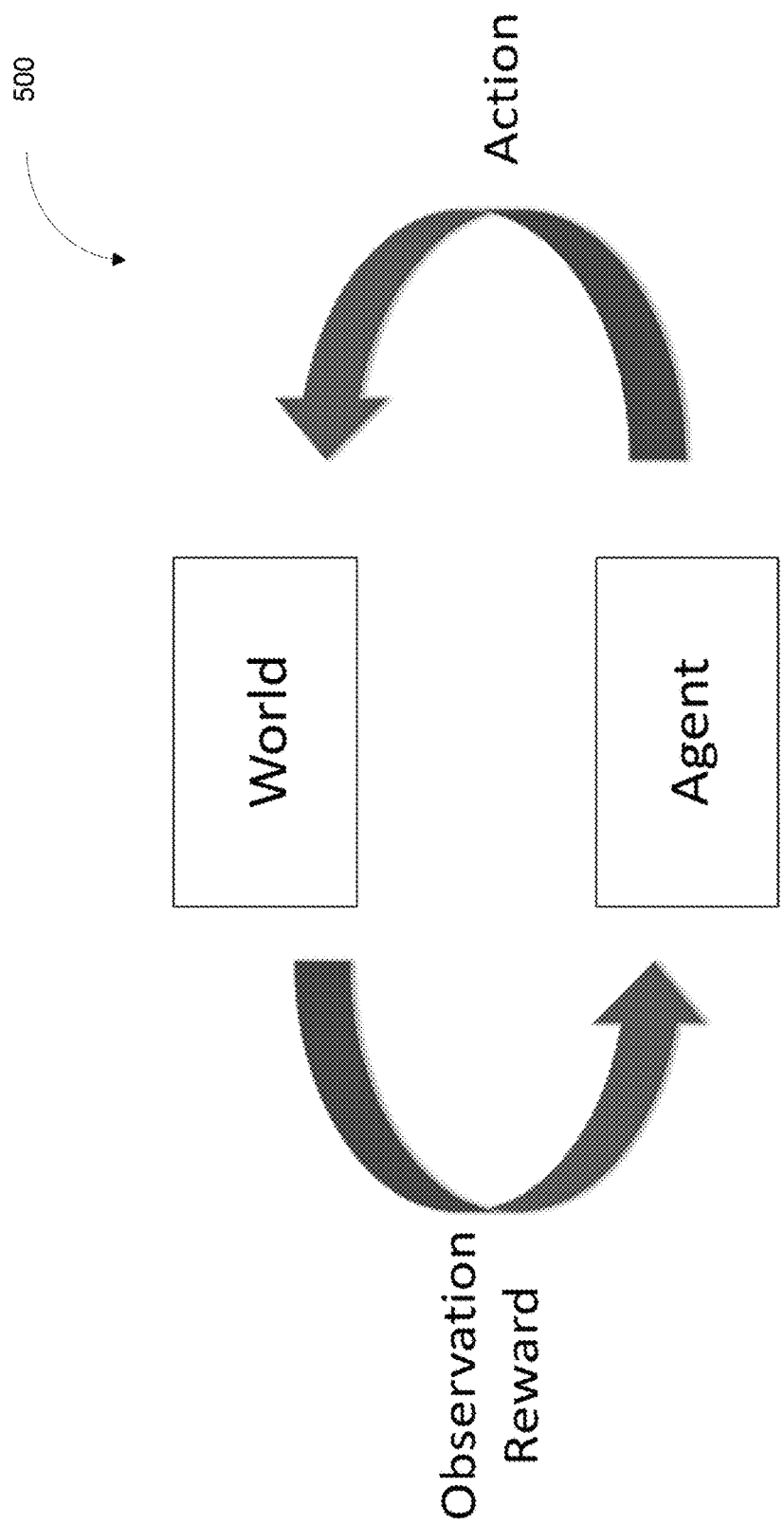
FIG. 5 is a schematic representation of an interaction between an agent included in an automatic livestock management system and an environment in which the agent takes action to implement an automatic livestock management process, according to an embodiment.

As described previously, an LM system can be configured to receive information related to animal handling and/or feed schedules of animals in managed livestock that produce bioproducts, receive inputs related to a target bioproduct quality, target property associated with health status, a target measure of waste of resources, a target cost associated with management, and/or a target balance between two of more aspects. The LM system can generate outputs including recommendation of animal handling and/or feed schedules that can be adopted to increase a likelihood of achieving the target aspects. In some implementations, the interactions between the components of the LM system including compute devices and LM device, or between virtualized agents and environments can be configured to be automatically carried out. FIG. 5 is a schematic representation of an interaction between an environment and an agent included in a livestock management system 500, according to an embodiment. The LM system 500 can be substantially similar in structure and/or function to the LM systems 100 and/or 400 described above. The LM system 500 includes an LM device (not shown in FIG. 5) that can be substantially similar to the LM devices 105, 305, and/or 405 described herein. The LM system 500 can include compute devices (not shown in FIG. 5) similar to compute devices 101-103, 201,401-403, and/or 406, described herein.

The LM system 500 includes a virtualized agent and a virtualized environment or world that the agent can act in using actions that impact a state of the world. The world can be associated with a set of states and the agent can be associated with a set of potential actions that can impact the state of the world. The world and/or a change in state of the world in turn can impact the agent in the form of an observation of a reward that can be implemented by the LM system 500. The LM system 500 can be configured such that the interactions between the world and the agent via actions and/or observations of rewards within the LM system 500 can be triggered and/or executed automatically. For example, an LM device within the LM system 500 that executes the interactions between the world and the agent can be configured to automatically receive inputs from sources or compute devices, and based on the inputs automatically trigger agent actions, state transitions in the world, and/or implementations of reward.

Figure 6:
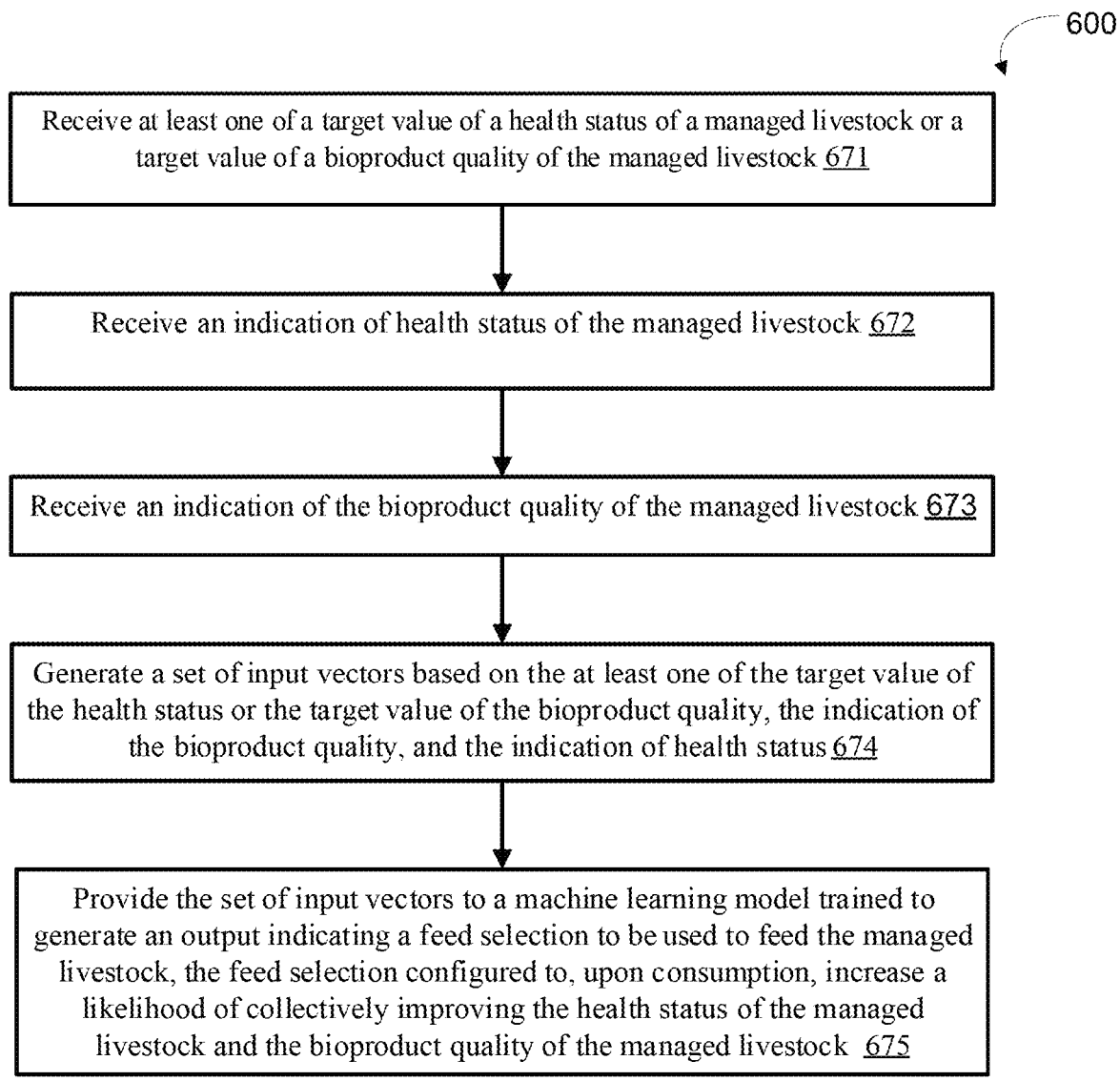
FIG. 6 is a flowchart describing a method of managing a livestock producing a bioproduct, according to an embodiment.

FIG. 6 illustrates an example method 600 of using the data received from the compute devices to generate an output indicating a recommended feed selection that can be administered to managed livestock, using an LM system, according to an implementation. The method 600 can be implemented by an LM system similar in structure and/or function to the LM systems 100, 400, and/or 500. In some embodiments, the method 600 can be implemented partially or fully by an LM device (e.g., a processor of an LM device) substantially similar in structure and/or function to the LM devices 105, 305, and/or 405, described herein.

At 671, the method 600 includes receiving at least one of a target value of a health status of a managed livestock or a target value of a bioproduct quality of the managed livestock. In some instances, the target value of a health status can be a target state of one or more animals (e.g., a target state of having a desired production rate). A target value of a bioproduct quality can include, for example, a level of protein content in milk, or a level of urea content in milk. An example of such a system is shown in the illustration in FIG. 7 of an LM system 700 that can be substantially similar in structure and/or function to the LM systems 100, 400, 500, and/or 600 described herein. In some instances, the target health status can be a desired health status of a lactating animal. In some instances, the target value of a bioproduct quality can be an increased measure of level of protein content in milk and/or a decreased measure of level of urea content in milk.

At 672, the method 600 includes receiving an indication of a current health status of the managed livestock. The indication of current health status can be received from animal handling personnel or alternatively from animal health specialists with access to information related to a current health status of the cohort of animals. In some instances, the indication of current health status can be received from one or more sensors associated with animal handling. The indication of current health status can be related to a particular animal, or a cohort of animals. Each animal in a cohort of animals can be identified by a unique identification marker). The indication of current health status can include details regarding well-being, age, weight, growth, production of bioproduct, quantity/quality of yield of bioproduct, etc. In some instances, the indication of current health status can include information obtained from analyses of bioproduct obtained. For example, the information can include bacteria, somatic cell, urea, casein and inhibitor counts obtained from milk samples. In some instances, the indication of current health status can include an indication of current productive status (e.g., current state with reference to a lactation cycle, current yield obtained, current state of illness, etc.). The indication of current health status can include a current status of feed blends or feed schedule (in some instances, including medicinal treatments or dietary supplements) provided to one or more animals in the livestock. As shown in the example in FIG. 7 the inputs can include a variety of available feed blends (Feed Blend$_0$, Feed Blend$_1$, Feed Blend$_2$), animal feeds, medications or medicinal treatments (medication$_0$, medication$_1$), dietary supplements (not shown), and/or medical interventions from a specialist or veterinarian (Veterinarian). The inputs can be provided to the ML model 757 as described herein.

At 673, the method includes receiving an indication of the bioproduct quality of the managed livestock. The indication of bioproduct quality can include any suitable measure of contents of a bioproduct sample. For example, an indication of bioproduct quality of milk obtained from livestock can include a measure of level of protein, fat, dry extract in milks and/or a measure of production (e.g., liters per day obtained). In some instances, the indication of bioproduct quality can be received from one or more sensors associated with animal handling. In some instances, the indication of bioproduct quality can be obtained from remote/external sources (e.g., third party laboratories used to process samples of bioproducts).

At 674, the method includes generating a set of input vectors based on the at least one of the target value of the health status, the target value of the bioproduct quality, the indication of the bioproduct quality, or the indication of health status. In some instances, the input vectors can be based on any other suitable inputs including indication of current health status, current status of feed blends or feed schedule (in some instances, including medicinal treatments or dietary supplements) provided to one or more animals in the livestock, a variety of available feed blends/animal feeds, medications or medicinal treatments, dietary supplements, and/or medical interventions from a specialist or veterinarian, projected costs associated animal handling such as costs associated with feed/medicinal treatments/dietary supplements or receiving consultation from a specialist, seasonal variations in the market for the bioproducts produced by the livestock, consumer demands for the bioproduct, customized qualities desired by the consumers in the bioproduct, past history of animal health or lactation health, statistics from other farms or organizations related to management and/or animal handling, history of interventions performed on a livestock and associated consequences or results observed in the livestock, and/or the like.

At 675, the method includes providing the set of input vectors to a machine learning model trained to generate an output indicating a feed selection to be used to feed the managed livestock. The feed selection is configured to, upon consumption, increase a likelihood of collectively improving the health status of the managed livestock and the bioproduct quality of the managed livestock. As shown in the example in FIG. 7, the inputs can be provided in the form of input vectors to the ML model 757. The LM device can generate input vectors based on the target quality to be provided to an ML model to be implemented as a target in a virtualized world including virtualized agents capable of virtualized actions. The ML model can implement the world and agents acting in discreet time steps to induce discreet state changes that may result in specific rewards associated with specific actions of agents. In some implementations, the ML model can use rewards from prior learning or experience (e.g., learning based on data obtained from past virtualizations, from inputs received from compute devices associated with animal handling personnel and/or animal health specialists, etc.). The LM device can implement the world and the agents such that the agents act to improve and/or maximize a cumulative reward. The scheme of cumulative rewards can be organized such that the LM device is configured to pursue conditions or states of the virtualized world that increase the likelihood of the world to arrive at a state of achieving a desired goal. The desired goal can include any suitable target aspect of animal handling including target costs associated with management of a livestock, target bioproduct quality, target health status, and/or target collective improvement in or balance between two or more aspects as the case may be. For example, the state arrived at can include a target production of bioproduct of a particular quality with a target reduced measure of loss of production in a cohort of animals or a target cost associated with production of a target amount of bioproduct of a particular quality by a cohort of animals in a livestock. In some instances, the state arrived at can include a target reduced waste of resources that increases a likelihood of production of a desired quantity and/or quality of bioproduct within a specified budgetary limit. The LM device can generate outputs and/or predictions indicating a feed selection or feed schedule (which can include medicinal treatment and/or dietary supplements) that is recommended in feeding the cohort of animals to increase a likelihood of meeting the desired goal(s).

In some instances, an LM System can be used to guide in assignment of animals in a managed livestock to groups defined by the intended end-use of the bioproduct that will be produced. In some implementations, the assignment of animals to groups can be based on target goals or target quantities/qualities of properties associated with the bioproduct. In some instances, an output of an LM system can indicate how many animals are to be assigned to each group such that they reproduce at a target rate and/or produce bioproducts at a target rate to meet a set of customer or end-use demands.

Figure 7:
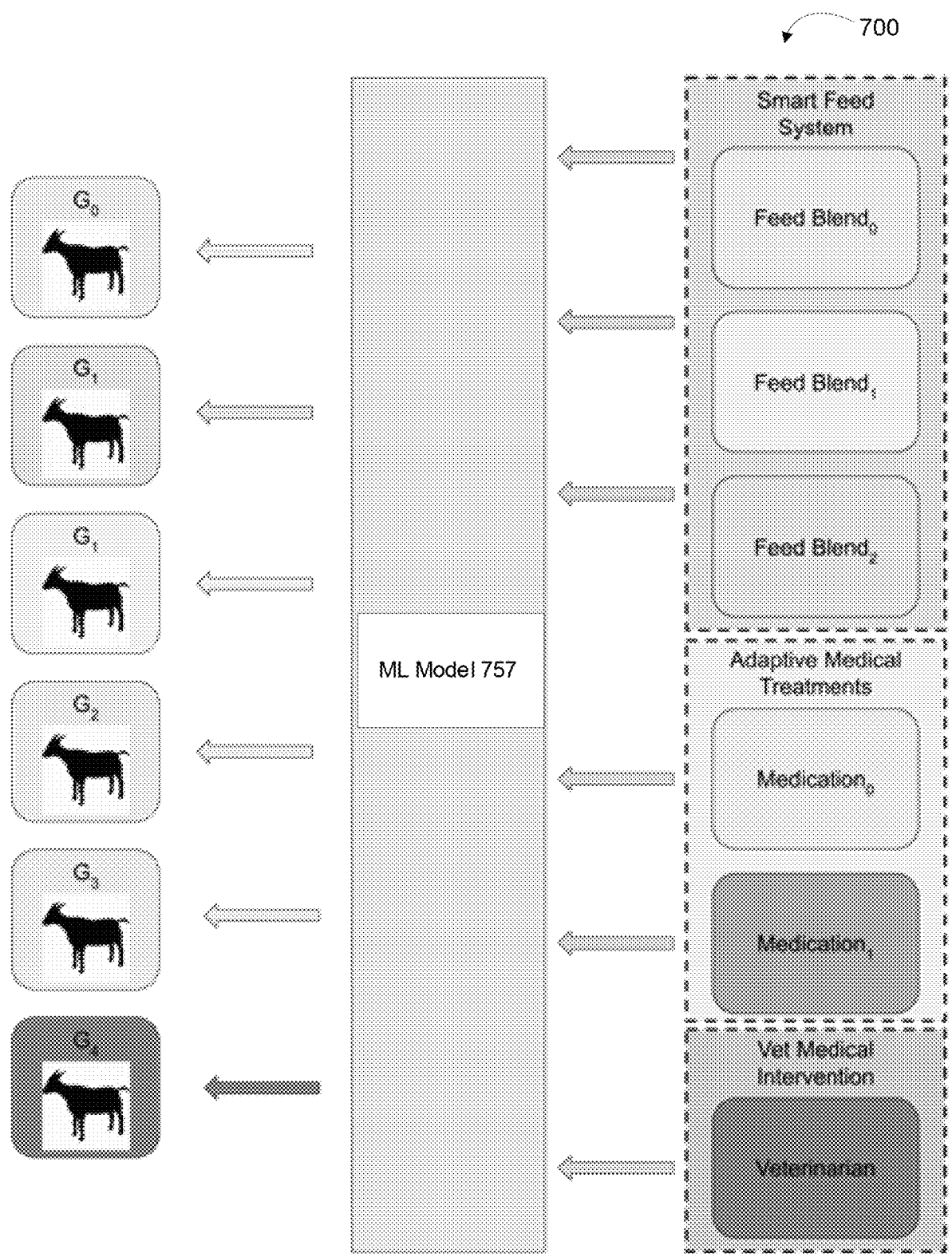
FIG. 7 is a schematic representation of a flow of information within a livestock management system implementing machine learning to collectively manage livestock health and bioproduct quality, according to an embodiment.

For example, the output of an LM system can indicate that to meet the requirement of several different end uses of three kinds of customers (milk, cheese, butter, yogurt producers, etc.), the animals (e.g., goats) in a managed livestock should be assigned to five groups that follow customized feed and/or care schedules as shown in FIG. 7 for a period of time. The output of an LM system can indicate that each of the five groups of goats should include a different count or number of animals to obtain a specific quantity and/or quality of milk desired by customers associated with each group. The LM system can be used to generate the assignment of animals to each group based on a current and/or projected health status of each animal and a current and/or a projected yield of bioproduct from each animal. As shown in the example in FIG. 7, the system can provide several recommendations directed to several cohorts of animals based on the output of the ML model. For example, the animals can be assigned to cohorts or groups $G_0, G_1, \ldots G_4$. Each cohort can receive a recommended feed blend or feed schedule based on outputs from the ML model 757, such that there is an increased likelihood that each cohort can achieve a state that includes the target reproductive property associated with a health status. As an example, animals in the group $G_0$ can be assigned to produce milk to be purchased by distributors of milk. The animals in the group $G_1$ can be assigned to production of milk to be sold to end use customers who are manufacturers of cheese-based products. The animals in the group $G_4$ can be assigned to production of milk to be sold to end use customers who are manufacturers of yogurt or yogurt-based products. Each group can have a target reproductive property or target health status associated with the group to meet a desired goal of the farmer. The LM system can be configured such that the ML model and/or the LM system can provide outputs that include feed schedule and/or care schedule customized for each group to meet a customized target associated with each group. For example, in a given period, a farmer may receive purchase orders from a given number of milk distributors, cheese manufacturers and yogurt manufactures for a time in the future. The farmer may use the LM system to assign animals to each group and determine a feed schedule and/or animal care protocol to be followed to ensure a quantity/quality of milk produced in each group such that the farmer may meet the customer demands.

At 675, the method 600 includes administering a feed blend to the managed livestock, the feed blend including the feed selection according to the output. The LM device can provide a feeding schedule of a specific feed blend including the feed selection that can be adopted to increase the likelihood of achieving the target quality.

In some embodiments, the disclosed LM systems and/or methods can include implementation of cognitive learning in the learning of agent-world interactions. In some implementations, an LM system can be implemented based on a hierarchical cognitive architecture as described, and/or using a hierarchical learning algorithm by an LM Device (e.g., LM Device 105 and/or 305) or a compute device (e.g., compute device 101-103, and/or 201) as described herein. A hierarchical reinforcement learning algorithm can be configured to decompose or break up a reinforcement learning problem or task into a hierarchy of sub-problems or sub-tasks. For example, higher-level parent-tasks in the hierarchy can invoke lower-level child tasks as if they were primitive actions. Some or all of the sub-problems or sub-tasks can in turn be reinforcement learning problems. In some instances, an LM system as described herein can include an agent that can include many capabilities and/or processes including: Temporal Abstraction, Repertoire Learning, Emotion Based Reasoning, Goal Learning, Attention Learning, Action Affordances, Model Auto-Tuning, Adaptive Lookahead, Imagination with Synthetic State Generation, Multi-Objective Learning, Working Memory System, and/or the like. In some embodiments, one or more of the above listed capabilities and/or processes can be implemented as follows.

(i). Repertoire Learning—Options learning can create non-hierarchical behavior sequences. By implementing repertoire learning hierarchical sequences of options can be built that can allow and/or include increasingly complicated agent behaviors.

(ii) Emotion Based Reasoning—Emotions in biological organisms can play a significant role in strategy selection and reduction of state-spaces improving the quality of decisions.

(iii) Goal Learning—Goal learning can be a part of the hierarchical learning algorithm. Goal learning can be configured to support the decision-making process by selecting sub-goals for the agent. Such a scheme can be used by sub-models to select action types and state features that may be relevant to their respective function.

(iv) Attention Learning—Attention learning can be included as a part of the implementation of hierarchical learning and can be responsible for selecting the features that are important to the agent performing its task.

(v) Action Affordances—Similar to Attention learning, affordances can provide the agent with a selection of action types that the agent can perform within a context. A model implementing action affordances can reduce the agent's error in behavior execution.

(vi) RL Model Auto-Tuning—This feature can be used to support the agent to operate in diverse contexts by changing contexts via auto-tuning altering the way in which a model is implemented.

(vii) Adaptive Lookahead—Using a self-attention mechanism that uses prior experience to control current actions/behavior, the adaptive lookahead can automate the agent search through a state space depending on the agent's emotive state and/or knowledge of the environment. Adaptive lookahead can improve the agent's computational needs by targeting search to higher value and understood state spaces.

(viii) Imagination with Synthetic State Generation—Synthetic state generation can facilitate agent learning through the creation of candidate options that can be reused within an environment with the agent not having to experience the trajectory first-hand. Additionally, synthetic or imagined trajectories including synthetic states can allow the agent to improve its attentional skills by testing selection implementation of different feature masks such as attention masks.

(ix) Multi-Objective Learning—Many real-world problems can possess multiple and possibly conflicting reward signals that can vary from task to task. In this implementation, the agent can use a self-directed model to select different reward signals to be used within a specific context and sub-goal.

(x) Working Memory System—The Working Memory System (WMS), can be configured to maintain active memory sequences and candidate behaviors for execution by the agent. Controlled by the executive model (described in further detail herein), WMS facilitates adaptive behavior by supporting planning, behavior composition and reward assignment.

These capabilities and/or processes can be used to build systems that function with 98% less training data while realizing superior long-term performance.

In some embodiments, the systems and/or methods described herein can be implemented using quantum computing technology. In some embodiments, systems and/or methods can be used to implement, among other strategies, Temporal Abstraction, Hierarchical Learning, Synthetic State and Trajectory Generation (Imagination), and Adaptive Lookahead.

Temporal Abstraction is a concept in machine learning related to learning a generalization of sequential decision making. An LM system implementing a Temporal Abstraction System (TAS) can use any suitable strategy including an options framework, bottleneck option learning, hierarchies of abstract machines and/or MaxQ methods. In some implementations, using the options framework, an LM system can provide a general-purpose solution to learning temporal abstractions and support an agent's ability to build reusable skills. The TAS can improve an agent's ability to successfully act in states that the agent has not previously experienced before. As an example, an agent can receive a specific combination of inputs indicating a sequence of states and can make a prediction of a trajectory of states and/or actions that may be different from its previous experience but effectively chosen based on implementing TAS. For example, an agent operating in an LM system simulating a world involving the management of livestock can receive, at a first time, inputs related to a health status of a cohort of animals on a predefined feed. The agent can be configured to interact with the world such that the LM system can predict a progress in health status and/or a yield of bioproduct, even if the prediction is different from the agent's past experience, based on implementing TAS. The prediction can include a recommendation of feed selection or feed schedule to increase a likelihood of achieving a predicted result (e.g., health status/yield). Another example includes agents operating in financial trading models that can use TAS to implement superior trading system logic.

The TAS can support generalization of agent behavior. The TAS can also support automatic model tuning where agents/agent actions can be used to automatically adjust agent hyperparameters that affect learning and environment behaviors/interactions. For example, in some embodiments of an LM system, a set of parameters can be defined as hyper parameters. Some parameters involved in reinforcement learning include parameters used in Q-value update such as a learning rate a, a discount factor associated with weight of future rewards $\gamma$, and a parameter to balance between exploration and exploitation by choosing a threshold value $\varepsilon$. These parameters can be implemented as hyperparameters that can be defined to be associated with an agent such that a specified change in a hyperparameter can impact the performance of the model and/or the agent in a specified manner. In some instances, a specified change in a hyperparameter can for example modify an agent from a practiced behavior to an exploratory behavior. An agent and/or a model can learn a set dependencies associated with hyperparameters such that a hyperparameter can be automatically tuned or modified in predefined degrees to alter agent behavior and/or model behavior.

As an example, an LM system can be configured to generate a first feed selection or feed schedule selection based on one set of inputs and/or an indication of a first state received at a first time. The LM system can receive a reward signal at a second time after the first time, and the reward signal can be associated with a second set of inputs and/or an indication of a second state. The LM system can generate a second feed selection or feed schedule selection in response to receiving the reward signal. In some instances, as described previously, the LM system can generate estimated rewards associated with actions of one or more agents based on predictions. The LM system can compare estimated rewards associated with specified actions with actual rewards received in response to the specified actions, and based on the comparison generate and/or update outputs. In some implementations, the LM system can be configured to, based on the reward signal, automatically adjust one or more hyperparameters and then generate the second feed selection or feed schedule selection using the adjusted hyperparameter(s) such that the adjusted hyperparameter leads to an improvement in the outcomes (e.g., yield) associated with the second feed selection compared to the outcome associated with the first feed selection based on the change.

In such an autotuning LM system, developers no longer have to iterate on finding model configurations with good convergence. The model can support contextually adaptive hyperparameter values depending on how much the agent is aware about the current context and/or the environment's changing reward signal. Working in concert, the agent learns reusable strategies that are context sensitive allowing the agent to support adaptive behavior over time while enabling the agent to balance explorative/exploitative behaviors.

As described previously, embodiments of an LM system described herein can implement temporal abstraction in the virtualization of a world and/or agents to implement temporally extended courses of action, for example, to determine a recommended protocol of animal handling to meet demands on production of bioproducts based on end-use. Disclosed herein is a method to recursively build and optimize temporal abstractions also referred to as options and hierarchical Q-Learning states to facilitate learning and action planning of reinforcement learning based machine learning agents.

In some implementations, an LM system can build and define a library or dictionary of options that can be used and/or reused partially and/or fully at any suitable time in any suitable manner. Learning temporal abstractions for example, skills and hierarchical states that can applied to learning can enable an LM system to learn to respond to new stimuli in a sophisticated manner that can be comparable or competitive to human learning abilities. The disclosed method provides an approach to automatically construct options and/or automatically constructing hierarchical states efficiently while controlling a rate or progress and/or growth of a model through the selection of salient features. When applied to reinforcement learning agents the disclosed method efficiently and generally solves problems related to implementing actions over temporally extended courses and improves learning rate and ability to interact in complex state/action spaces.

Figure 8:
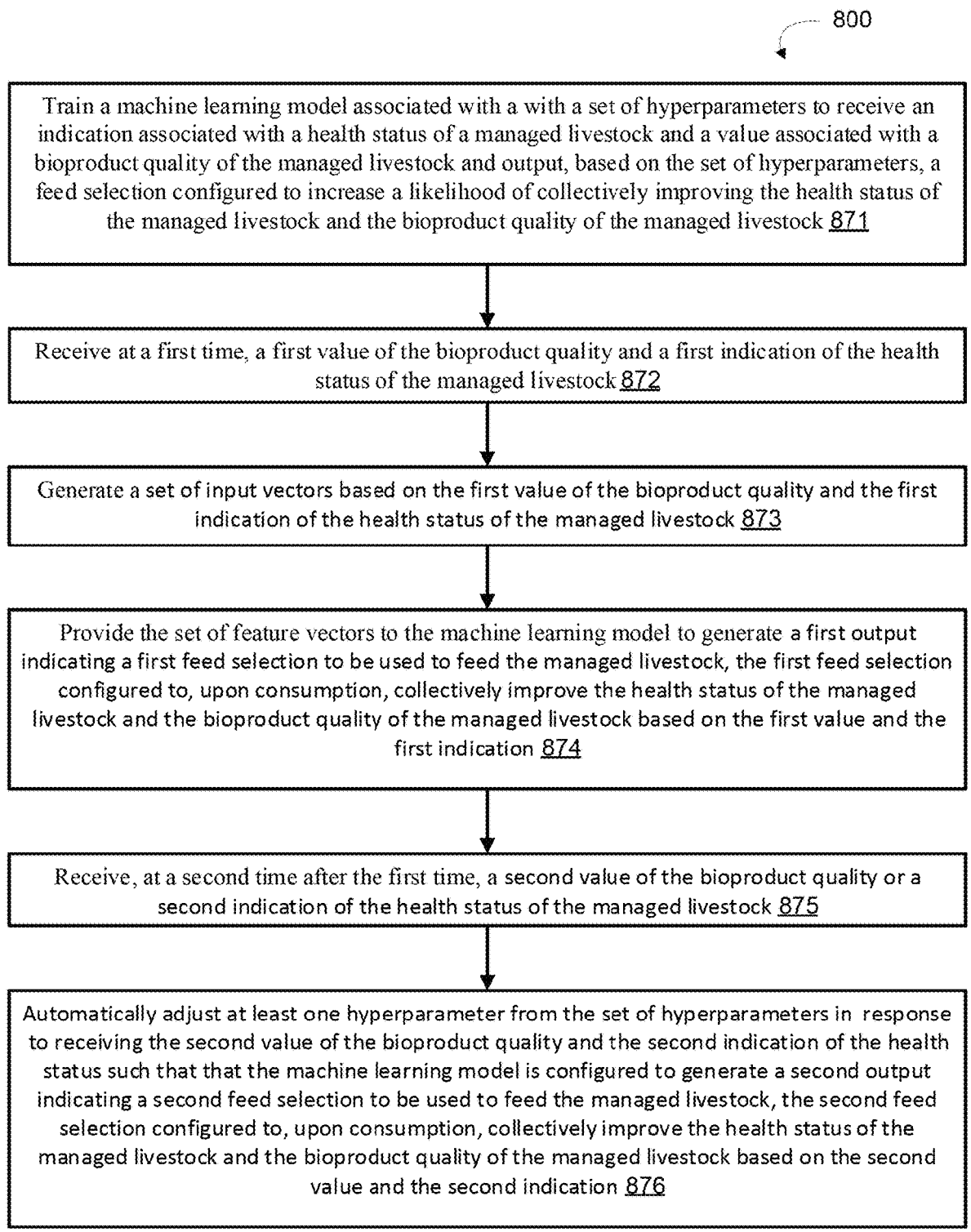
FIG. 8 is a flowchart describing a method of managing a livestock producing a bioproduct, according to an embodiment

FIG. 8 illustrates an example method 800 of training an ML model associated with a with a set of hyperparameters to receive inputs including an indication of a health status of animals in a managed livestock, and a value associated with a bioproduct quality, and output a feed selection to increase a likelihood of collectively improving the health status of the managed livestock and the bioproduct quality of the managed livestock. The method 800 can be implemented by an LM system similar in structure and/or function to the LM systems 100, 400, 500, and/or 700. In some embodiments, the method 800 can be implemented partially or fully by an LM device substantially similar in structure and/or function to the LM devices 105, 305, and/or 405, described herein.

At 871, the method 800 includes training and using a machine learning model associated with a with a set of hyperparameters to receive an indication associated with a health status of a managed livestock and a value associated with a bioproduct quality of the managed livestock and output, based on the set of hyperparameters, a feed selection configured to increase a likelihood of collectively improving the health status of the managed livestock and the bioproduct quality of the managed livestock. The hyperparameters can include learning rate, gamma future reward value and epsilon for explorative/greedy action selection. The model can be implemented using any suitable modeling tools including statistical models, mathematical models, decision trees, random forests, neural networks, etc. The training can be implemented using any suitable method including learning algorithms such as supervised learning, unsupervised learning and/or reinforcement learning. In some instances, the model can incorporate and implement temporal abstractions as described herein. The temporal abstraction can include options, skills, hierarchical states, and/or hierarchical actions as described herein.

At 872, the method 800 includes receiving at a first time, a first value of the bioproduct quality and a first indication of the health status of the managed livestock. The first value of a bioproduct can, for example, be a measure of protein content in milk obtained at a first time from a lactating animal. The first indication of health status can, for example, be a measure of yield of milk or a urea content in the milk obtained at the first time from the lactating animal. In some instances, the method 800 at 872 can further include receiving a goal defined using a target aspect of animal handling. The goal can include a desired improvement in the target aspect of animal handling. For example, the goal can include a collective improvement in health status and bioproduct quality of the managed livestock.

At 873, the method includes generating a set of feature vectors based on the first value of the bioproduct quality and the first indication of the health status of the managed livestock.

At 874, the method 800 includes providing the set of feature vectors to the machine learning model to generate a first output indicating a first feed selection to be used to feed the managed livestock, the first feed selection configured to, upon consumption, collectively improve the health status of the managed livestock and the bioproduct quality of the managed livestock based on the first value and the first indication. For example, the first feed selection can be configured to collectively increase the protein content and decrease the urea content in the milk produced by the livestock. As another example, the first feed selection can be configured to collectively increase the protein content and increase the yield of the milk produced by the livestock.

At 875, the method 800 includes receiving, at a second time after the first time, a second value of the bioproduct quality or a second indication of the health status of the managed livestock. In some implementations, the second time can be after the animals have been placed in care protocol following the first feed selection for a period of time. The second value of the bioproduct quality can be an indication of protein content (e.g., an indication of insufficient increase in protein content). The second indication of the health status can be, for example, an indication of illness or a reduction in yield, or an indication of insufficient (less than desired) reduction in urea content in the milk.

At 876, the method 800 includes automatically adjusting at least one hyperparameter from the set of hyperparameters in response to receiving the second value of the bioproduct quality and the second indication of the health status such that the machine learning model is configured to generate a second output indicating a second feed selection to be used to feed the managed livestock, the second feed selection configured to, upon consumption, collectively improve the health status of the managed livestock and the bioproduct quality of the managed livestock based on the second value and the second indication. The automatic adjustment can be done iteratively and any number of times in an adaptive manner. The hyperparameters can be adapted such that even when the second value of the bioproduct quality and/or the second indication of the health status are unexpected (or unfamiliar) inputs (or are inputs received at an unfamiliar state) that the machine learning model has not encountered during training the machine learning model is equipped to attempt and/or perform novel adjustments and adaptively learn to improve performance with progression of time. An example can include the decrease of the quality of milk produced by animals who supplement their farmer-provided feed by grazing. It is not uncommon for this foraging to include material that provides less nutritional value and/or changes the fat/protein quality of milk. The automated hyperparameter model can potentially decrease the Epsilon value threshold to enable the agent to be more explorative in its selection of feeds to account for the gap in protein or fat in the byproduct. An additional example includes the decrease in the health of livestock due to weather changes. The system can be configured to be operating in a mode that is focused on maximizing and/or increasing the protein content in the bioproduct. A side effect of sick animals, however, includes leaking of protein through urea. Such a loss results in the need to supplement an animal's diet with medicinal treatments to accelerate recovery. This can cause the hyperparameter model to reduce the Gamma value for future reward search and increase of the value of Epsilon to change the agent behavior to select feeds with reduced protein to reduce costs and the addition of a medicinal treatment to help with animal recovery.

In some implementations, the machine learning model can be configured to automatically receive inputs that can serve as reward signals and adaptively update, based on a difference metric, the temporal abstraction to generate the second output or a third output and so on, the second input including a second feed selection, the third input including a third feed selection and so on. The second feed selection can be configured to, upon consumption by the second managed livestock, increase a likelihood of achieving the target value of the property associated with the bioproduct of the second managed livestock based on the second indication of the property.

A temporal abstraction can be implemented by generating and/or using options that include sequences of states and/or sequences of actions. The implementation of options can be based on generating and adopting reusable action sequences that can be applied within known and unknown contexts of the world implemented by an LM system.

Figure 9:
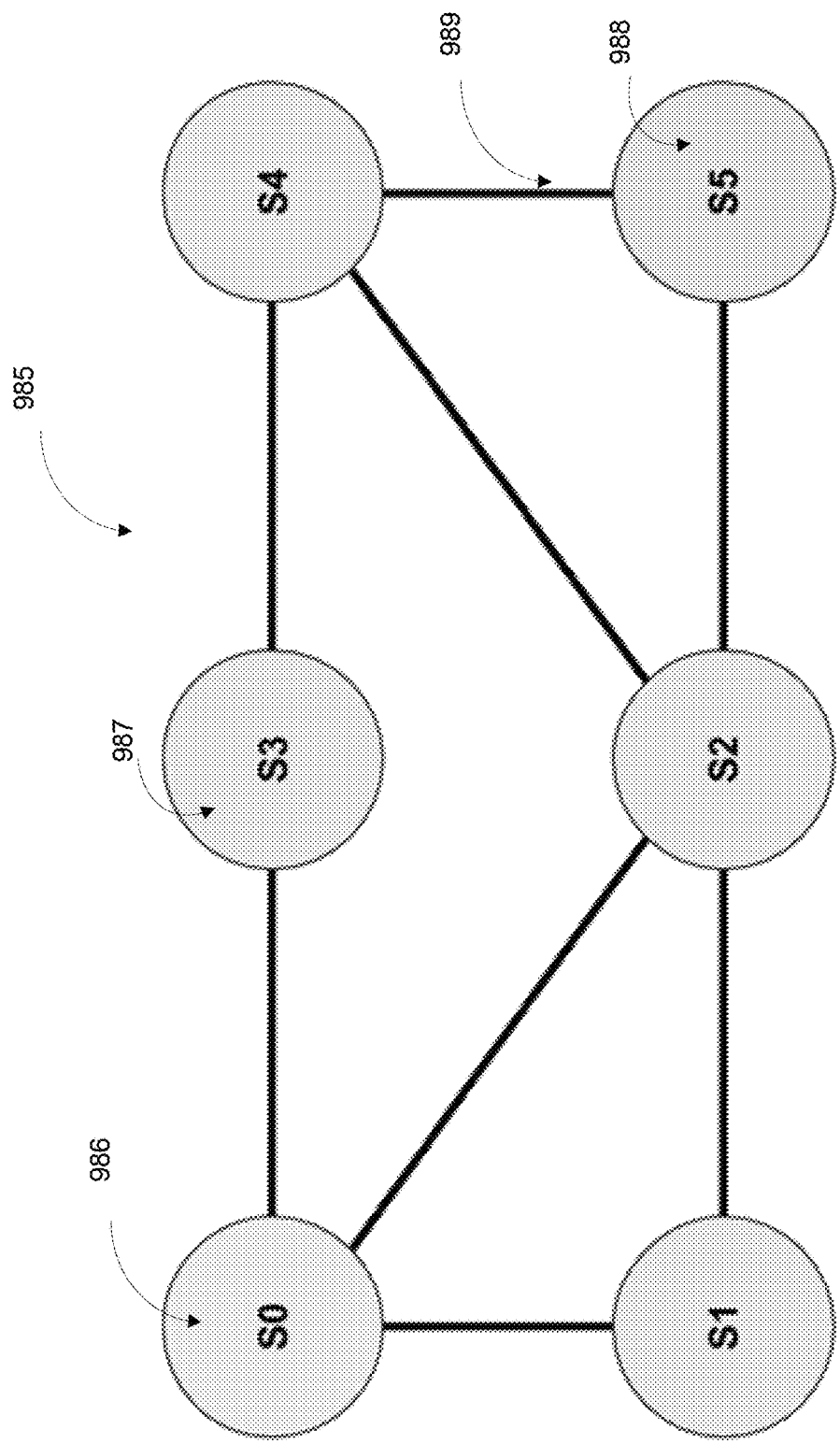
FIG. 9 is a schematic representation of states and state changes assumed by one or more agents implemented by a livestock management system, according to an embodiment.

An example option 985 is illustrated in FIG. 9. An option can be defined by a set of initiation states (S0) 986, action sequences 989 involving intermediary states (S1, S2, S3, S4) 987, and a termination probability associated with a termination state (S5) 988. When an option 985 is to be executed, the agent can be configured to first determine its current state and if any of the available options offers to have a start state that is similar to its current state. If there is a positive identification of an option that includes a start state the same as its current state, the agent can then execute the sequence of predefined actions for the new states included in the option until the agent reaches the termination state and the termination probability condition is set to true. For example, the agent can identify start state (S0) 986 to be similar to a current state and identify the option 985 as a selection to be executed. In some instances, the option 985 can then be executed by the agent starting at the start state 986 and progressing through intermediary states S1-S2-S5, via actions indicated by the lines joining the respective states, to reach the termination state S5 988. In some instances, the agent can execute the option 985 by starting at the start state S0 986 and progressing through state S2 alone, or through states S2-S4, or through states S3-S4 indicated by lines representing actions, to reach the termination state S5 988. At state S5 the option terminates and the agent proceeds to select another action or option as dictated by agent behavior designed by an agent manager and/or by outputs from an ML model.

In some instances, LM systems described herein can implement hierarchical states in reinforcement learning that can play a role in improving agent learning rate and/or in the development of long-term action plans. In some instances, with an increase in complexity of a task (e.g., increase in number of alternative solutions, increase in dimensionality of variable to be considered, etc.) the trajectory to the solution can become intractable due to exponentially increasing complexity of agent actions due to an increase in the number of states in the system. In some implementations, the LM system can implement hierarchical states, which decrease the size of a state space associated with an LM system. This implementation of hierarchical states and the resulting decrease in state space can lead to an exponential decrease in a time for learning in agents. Automatic learning of hierarchical states in conventional systems, however, can represent challenges by restricting size of models that can be used.

In some embodiments, an LM system can be configured that can learn options and generate and use hierarchical states effectively using a recursive execution of a process associated with a Bellman Optimization method as described herein. The recursive process can be configured to converge on optimal values over a period of time. The method can allow for the agent to select improved and/or optimal policies (e.g., actions resulting in state transitions) in known and unknown environments and update their quality values over time. In some instances, the method can treat options and hierarchical states as functionally dependent at creation and can allow for the merging of existing options and hierarchical states to build new state and action compositions. Over time, as the agent explores the state space, the algorithm can generate new hierarchical states and composition hierarchical states as the agent performs numerous trajectories through the state/action space.

Figure 10:
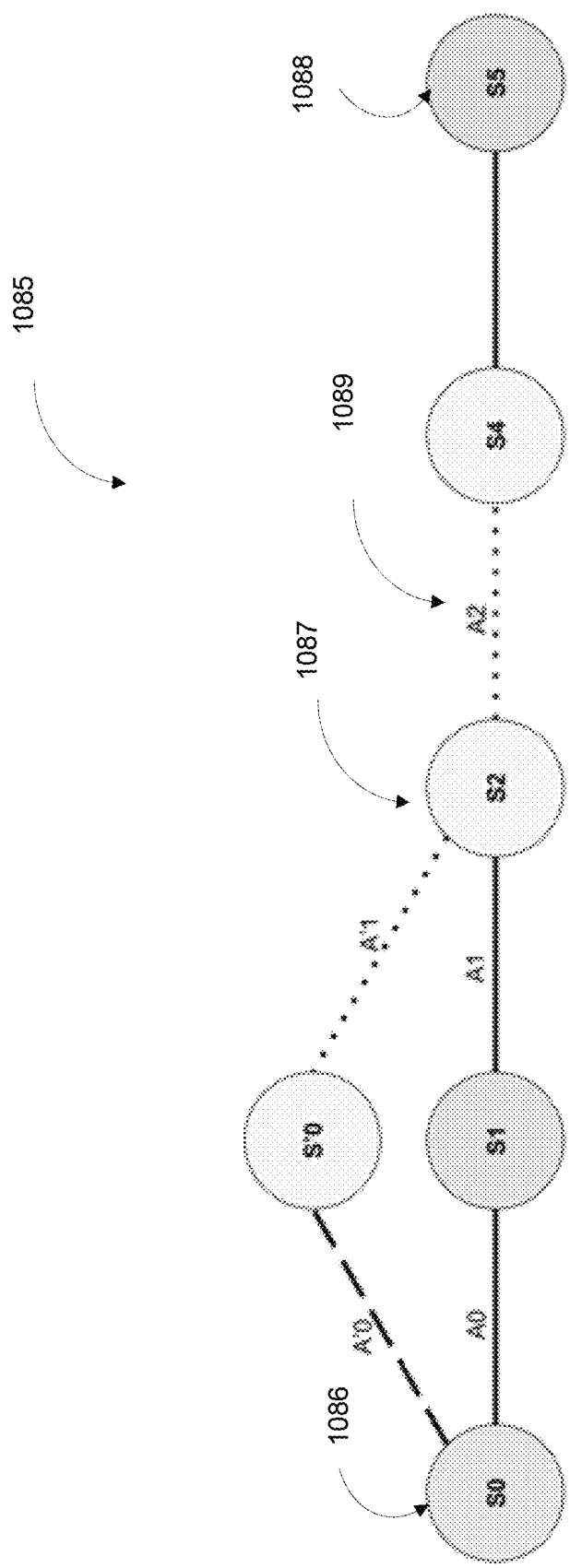
FIG. 10 is a schematic representation of a sequence of state changes including options assumed by agents included in a livestock management system, according to an embodiment.

FIG. 10 is an illustration of an example option 1085 and including hierarchical states (e.g., S'0) generated by an LM system, according to an embodiment. The option 1085 can include a start state 1086, intermediary states 1087 and termination state 1088. An example method adopted by the LM system can include building hierarchical states (e.g., S'0) and generating options (e.g., S2-S4, 1089).

To build a hierarchical state, the LM system can first identify two consecutive state/action transitions through the world. The LM system can perform a sequence of verification steps including verifying that (1) the identified state/action transitions have non-zero $Q^p(s,a)$ values (also referred to herein as Q values), which can be values associated with a state/action pair under a predefined policy, as defined previously, (2) the identified state/action sequence is non-cyclical, (3) that a sum of Q-values associated with the identified state/action transitions is at a percent value that is above a threshold value of interest (e.g., a threshold value set by a programmer/user), and (4) the transition sequence does not include a transition cycle from S0 to Sn.

Following the above steps, if positively verified the LM system can continue to the next step and if not the LM system can return to identifying two new consecutive state action transitions. If positively verified the LM system can create and/or define a new hierarchical state S', for example state S'0 as shown by S'0 in FIG. 10 and create and/or define a new state name (e.g., state X'). The new state can be associated with an action A'0 and an action A'1 as shown in FIG. 10.

The LM system can extract state primitives, and action primitives from standard and hierarchical state transitions. Based on the extracted information, the LM system can create and/or define a new hierarchical action from S0 state in sequence to the new hierarchical state S' (e.g., action A'0) and add the hierarchical action to a new hierarchical action associated with state S0. The LM system can create and/or define new hierarchical action from S' (e.g., action A'1 from state S'0) to an intermediary state (e.g., S2) or a last state in sequence Sn (e.g., S5 in FIG. 10) and add the newly created and/or defined hierarchical action to an action list associated with state Sn. The LM system can then add state S' (e.g., A'0) to Q Model states. This new hierarchical state can be reached using normal planning and its Q value can be updated using the current system logic. In some instances, an LM system can be configured to implement and/or learn to implement state deletion. In some instances, an LM system can consider combining multiple options to create a repertoire behavior or a subset of an option action sequence that can include states previously generated by temporal abstraction algorithm, also referred to herein as hierarchical states. The LM system can be configured to learn to merge the two options to form a single option that builds hierarchical states from the two options. In some instances, the LM system can merge two options by selecting a set of hierarchical states and merging the action primitives to construct a new hierarchical state.

To generate an option, the LM system can initiate an induction cycle, in some implementations, to create and/or define a state name S'x (eg., x=1, 2, . . . n) from action sequences by using action sequences extracted from hierarchical state algorithms. The LM system can identify an action A'x associated with the state S'x. The LM system can check that action A'x is not in a preexisting dictionary of options and that a sum of action Q values associated the action sequence including A'x is above a threshold value of interest. If the verification steps are indicated to be true (i.e., A'x is not in the dictionary of options and the sum of action Q values associated with the action sequence including A'x is above a threshold value) the LM system can continue, if not the system exits from induction cycle. If true, the LM system can create and/or define an option with an S0 state from hierarchical state induction sequence as initial initiation state or start state.

A method to construct hierarchical states can be implemented using reinforcement learning. The method can be associated with agents and can use pairwise state/action transitions to recursively optimize and/or improve action values using the Bellman Optimality Principle. In some implementations, the method can use a Q-value threshold to determine if a new hierarchical state is to be added to the model (e.g., reinforcement model). In some implementations, the method can include generating hierarchical states in a recursive manner from other hierarchical states.

A method to construct options/skills can be implemented using reinforcement learning. The method can be associated with agents and can use pairwise state/action transitions to recursively optimize action values using the Bellman Optimality Principle. The method can use a Q-value threshold to determine if a new option/skill is to be added to the reinforcement model's options dictionary. In some implementations, the method can include generating hierarchical states associated with options/skills in a recursive manner from other hierarchical states.

In some implementations, the LM system can additionally support automatic merging of previously generated hierarchical states with new action trajectories or action sequences in a manner that can be consistent with an existing sequence of states/actions. This functionality can simplify a process of building and maintaining hierarchical states no matter how complex an environment is in a general and fully automatic algorithm. The disclosed LM systems and/or methods can thus reuse existing Q-Learning model insertion, update and deletion mechanisms to manage hierarchical states. By using model update mechanisms of Q-Learning, selection of hierarchical states can help convergence to optimal and/or improved values over time according to the Bellman Optimality Principle. In some such implementations, the LM system thus combines sample efficient methods for the generation and merging of hierarchical states with mathematically mature methods to ensure that the quality of actions and options executed over time converge to optimal and/or improved values.

In some embodiments, the disclosed LM systems and/or methods can include implementation of cognitive or hierarchical learning in the learning of agent-world interactions. In some implementations, as described herein, an LM system can be configured to operate as a Hierarchical Learning System (HLS) that can implement a hierarchical learning algorithm that utilizes a recursively optimized collection of models (e.g., reinforcement learning models) to support different aspects of agent learning.

Figure 11:
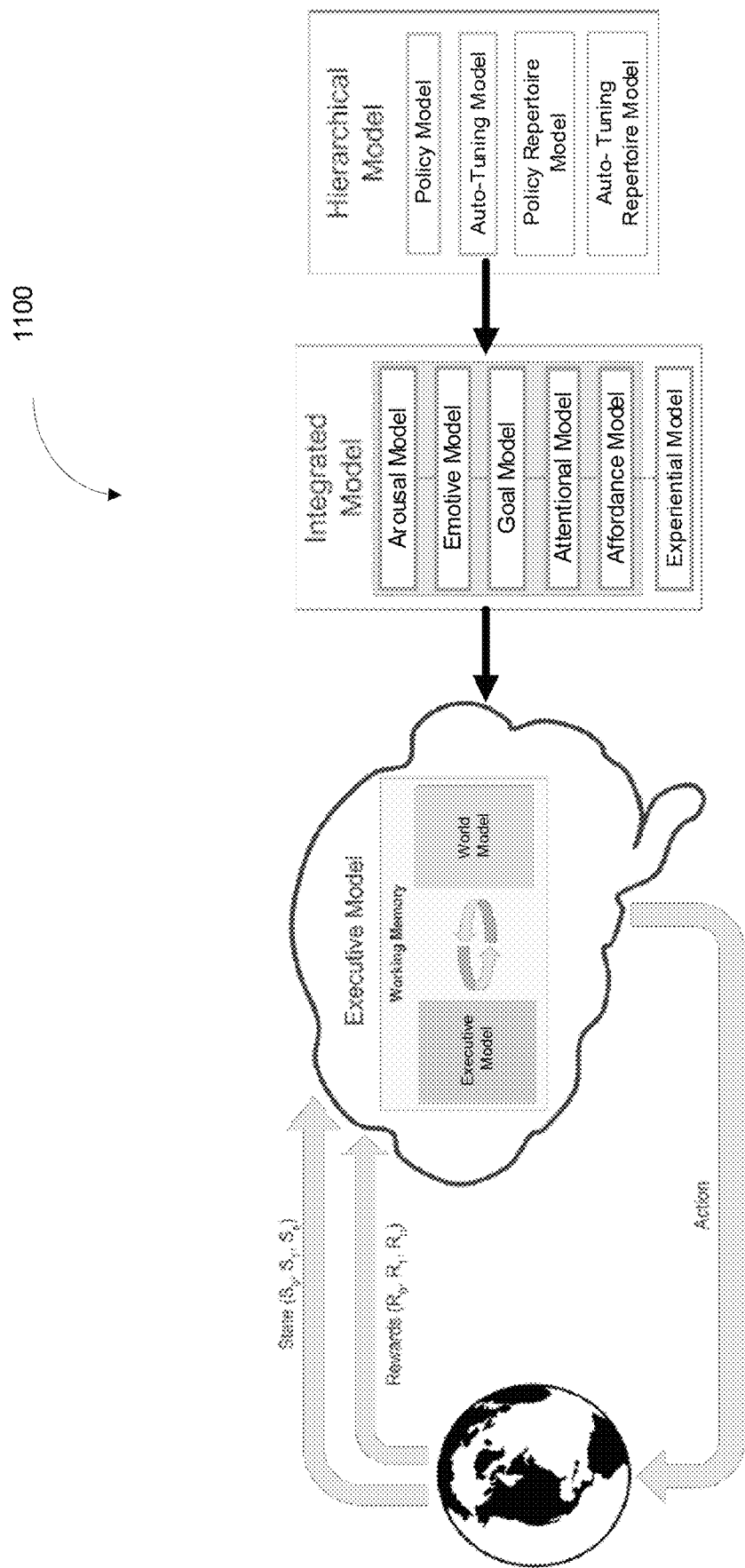
FIG. 11 is a schematic representation of interaction between agents implemented by a livestock management system using hierarchical models and the external world environment, according to an embodiment.

FIG. 11 illustrates a schematic representation of an LM system 1100, implementing cognitive learning, according to an embodiment. The LM system 1100 can be substantially similar in structure and/or function to the LM systems 100, 400, 500, and/or 700, and can implement methods similar to methods 600 and/or 800 described herein. In some embodiments, the cognitive learning in the LM system 1200 can be implemented by an LM device substantially similar in structure and/or function to the LM devices 105, 305, and/or 405, described herein.

Figure 13:
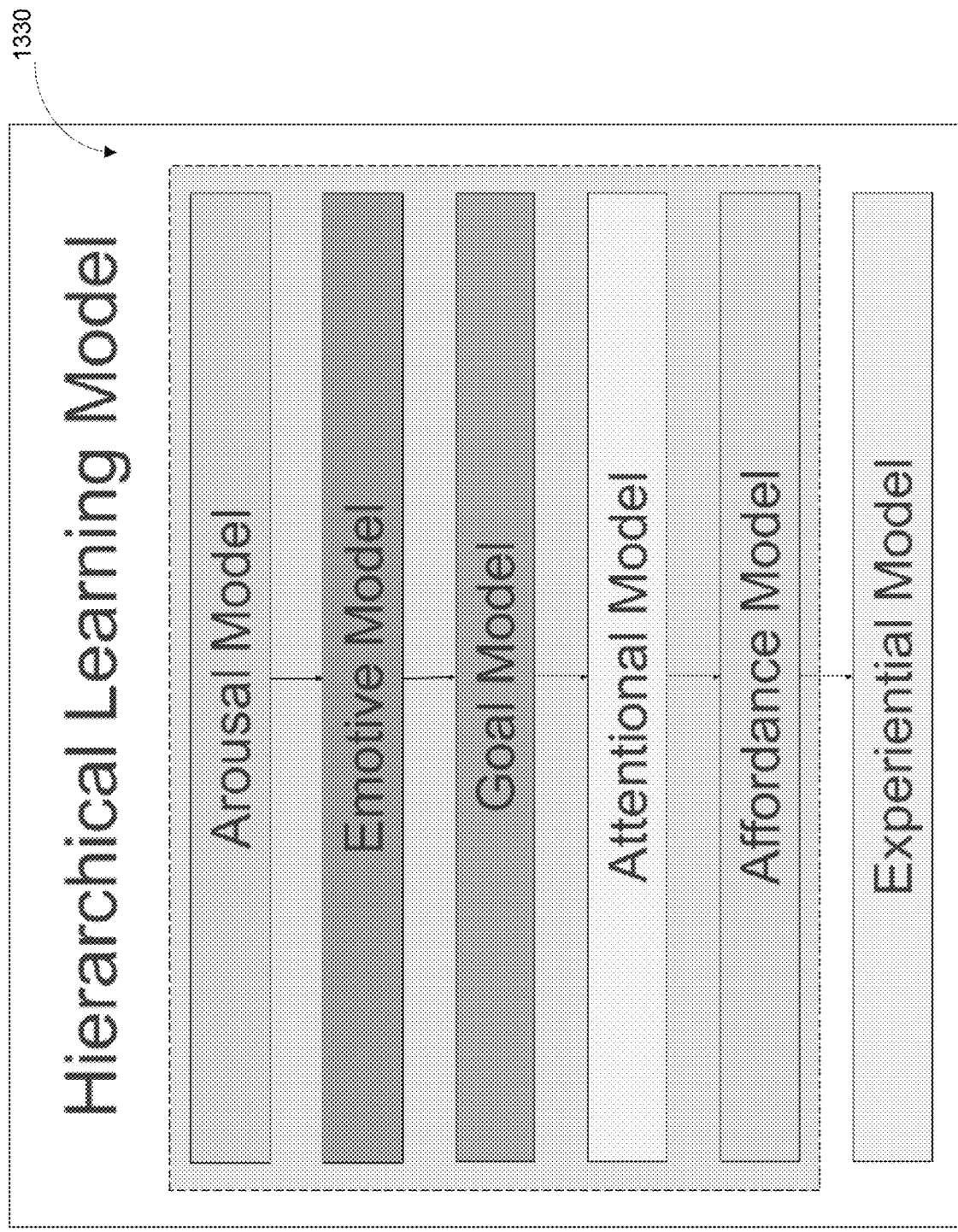
FIG. 13 is a schematic representation of an example hierarchical model implemented by a livestock management system, according to an embodiment.

In some implementations, a model (e.g., the ML model 357 described previously) in an LM system can include multiple models that in some instances, can be configured in a hierarchical organization. The LM system 1100 can include an agent/system architecture as shown in FIG. 11, such that agent interactions with the world are based on a set of models including an executive model, an integrated model, and a hierarchical model. The world can have many states (S0, S1 . . . Sn) and states can be associated with rewards (R0, R1 . . . Rn). An agent can be defined to interact with the world via actions and the agent actions can have consequences including an impact on the state, changes in the state of the world, and/or rewards. The executive model can include a model simulating a working memory component. The working memory component can in turn include an executive model that is configured to simulate agent actions and a world model that is configured to simulate world states, state transitions, responses to agent actions including rewards, etc. s The integrated or hierarchical learning model (also illustrated in FIG. 13) can include multiple models that are each configured to simulate various levels of cognitive and/or behavioral functions including arousal states, emotive states, goals, attentional states, affordance, experiential states, etc. As an example, organized over the experiential model that provides actions that interact with the world, an HLS can use a model simulating emotions capable in an animal to enable the agent to select strategies that include sub-goals, state features to attend to, and action types the agent can execute within a particular context. This capability effectively reduces the strategy space in which the agent can act and can improve behavior selection while dramatically reducing reward variability over time. The hierarchical model can include a policy model that is configured to generate, modify, and/or learn to generate and modify policies on which an agent's interactions with an environment can be based. The hierarchical model can include an auto-tuning model that can be configured to implement adjustment of one or more parameters or hyperparameters of the policy model, a policy repertoire model that defines and/or creates more complex behaviors by combining world policy options, and an auto-tuning repertoire model that builds more complex hyperparameter configurations by combining auto-tuning options.

Using the hierarchical architecture of the cognitive model, the LM system can be configured to operate effectively even in new environments by automatically surveying the environment and automatically tuning hyperparameters based on results of agent interactions. The executive model of the Working Memory System (WMS) can provide memory and behavior replay management of the agent. Specifically, the WMS can orchestrate the internal/external generation of experience and replays to adaptively learn temporal abstractions and selection of potential behaviors for future execution. The cognitive model can thus provide a general purpose LM system for state and action spaces used by the agent.

Figure 12:
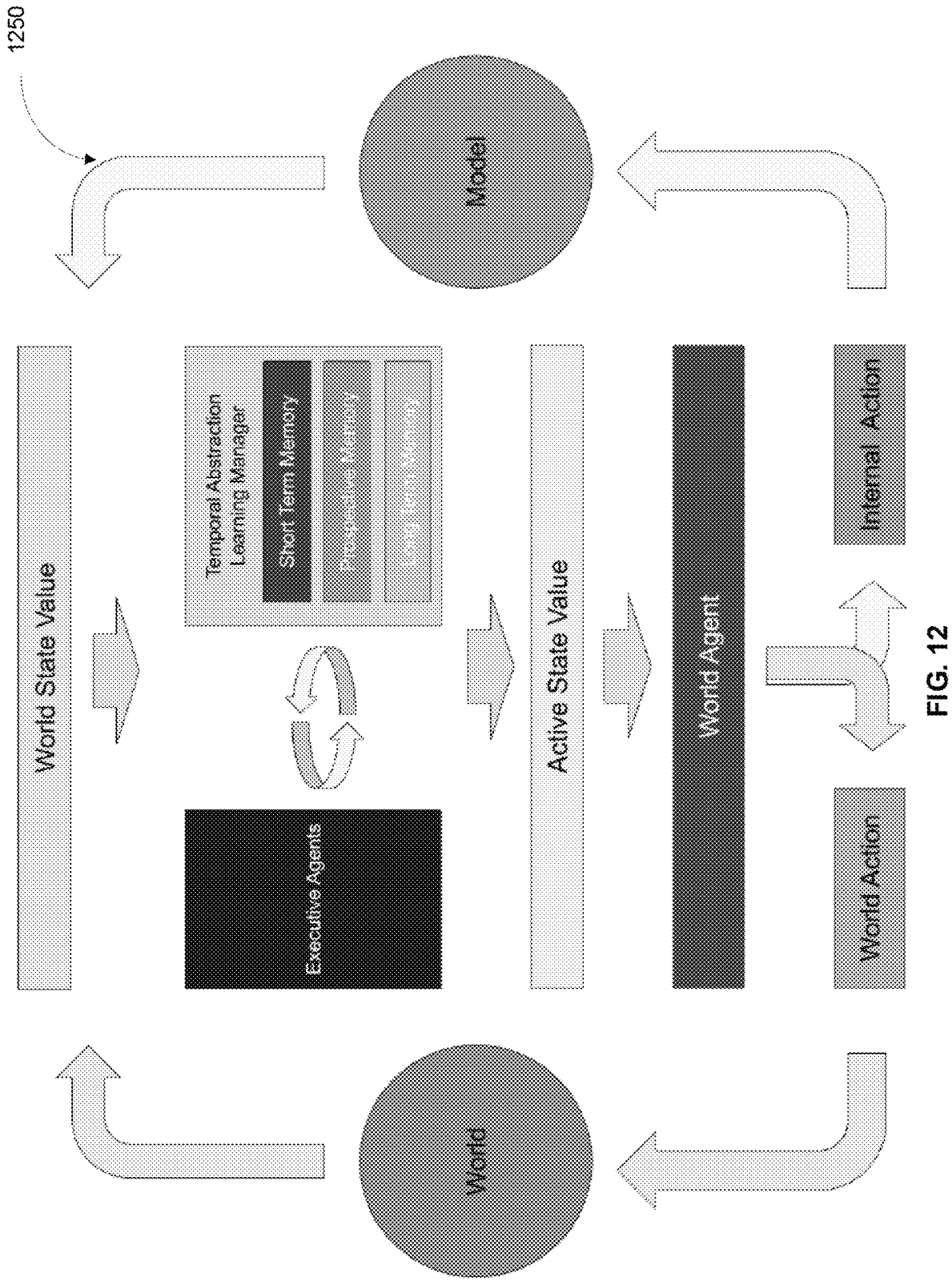
FIG. 12 is a schematic representation of a flow of information in a livestock management system implementing agents and temporal abstractions to learn relationships in a world environment, according to an embodiment.

In some implementations, an LM system can operate by using a model to simulate an external world and an internal model to simulate an internal world or representation (e.g., an internal representation of an animal or a cohort of animals, etc.). The internal model can be associated with internal states that can be perceived, organized using a system of memory, and impacted via internal actions. The internal model can be configured to impact a world state value and in turn impact agent action/behavior. FIG. 12 is a flowchart 1250 schematically illustrating a flow of information in an LM system similar to the systems described above. The LM system included in the flow chart shows the two primary flows of information through the agent reasoning system. In the World flow path, on the left side in FIG. 12, the LM system selects behaviors that result in actions that are executed in the world. In the secondary path, to the right side in FIG. 12, the LM system interacts with its model of the world and is used for planning and creating options. In some implementations, the LM system can implement an ML model (e.g., ML model 357) that includes an executive model an example work flow of which is shown in FIG. 12. An executive model can be responsible for the management of content in an active memory associated with an agent. Active memory can support creating an agent and/or supporting the agent with performing complex behaviors. An LM system can implement a ML model by using one or more memory stores including, for example, short term memory, prospective memory, long-term memory, etc. which can, in some embodiments, be associated with a memory of an LM Device (e.g., memory 352 of LM Device 305 in FIG. 3). The executive model can load the active memory (e.g., a system of active memory) from one of the multiple memory stores that include: Short-Term Memory, Prospective Memory and Long-Term Memory. The World Model is responsible for the selection of actions to be performed based on the active memory contents. The model in an LM system can receive information associated with a world state and its reward signal, which can impact interactions between executive model and the memory which leads to new behaviors. In some embodiments, the LM device (e.g., LM devices 105, 305) and/or the compute device (e.g., compute devices 101-103, 201) of the LM system can include a temporal abstraction manager. In some implementations, for example, the temporal abstraction manager can be included in an agent manager (e.g., agent manager 356 of LM Device 305 in FIG. 3). The temporal abstraction manager analyzes the changing contents of the memory system to discover new options and repertoire of options. Information associated with the value can be relayed to the world model, which can be translated into an agent's action in the external world, which can impact the world state, or an internal action that impacts an internal representation or internal model.

As an example, a model of the world can be a model of a cohort of animals managed in a group intended to produce milk to be purchased by manufacturers of cheeses. The world model can simulate states such as a cohort of animals at a current health status with a first average quality of milk, a first average yield of milk, a first duration of feed consumption, a first average amount of loss of production, a first average amount of waste of resources (e.g., in the form of leaked protein), etc. As an example, an internal model can be a model of an animal cohort that is in a similar state as the current world state. The internal model can simulate states of a cohort including lactation states in a lactation cycle, states of hunger, states of growth, etc. Each of the internal states can be configured to impact a world state and vice versa. The impact on the world state and/or the internal model can in turn result in a world state or world state transition, each of which can be associated with a value and used for planning by the LM system. The world state value can recursively impact the interactions between executive model, world model and the temporal abstraction manager.

Figure 14:
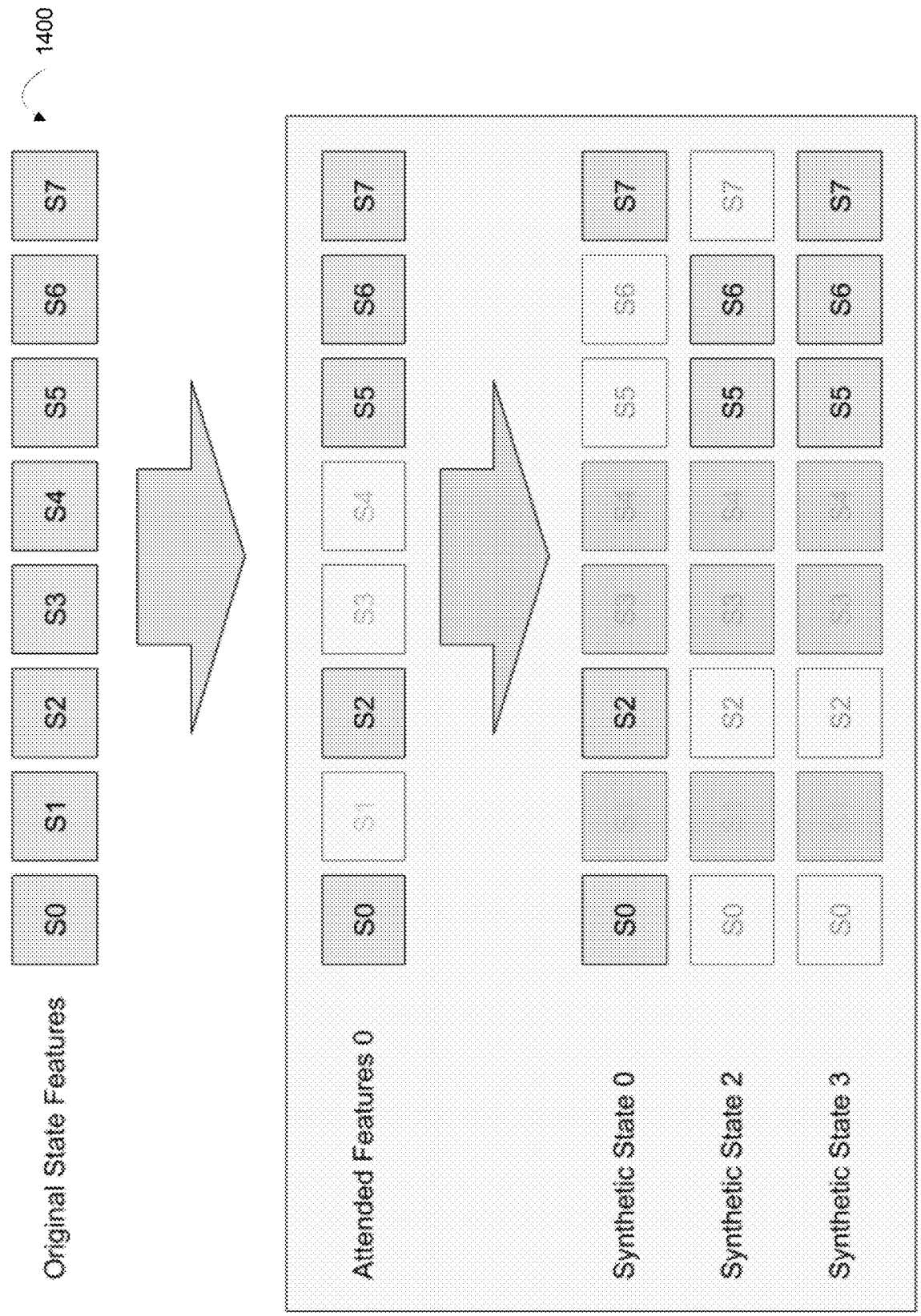
FIG. 14 is a schematic representation of a flow of information in a livestock management system implementing generation of synthetic states, according to an embodiment.

In some embodiments, the LM systems described herein can implement the Working Memory System (WMS) such that the WMS functions similar to a biological model and includes multiple subsystems that manage long term behavior selection, planning, and skill learning. In some implementations, an LM system can be configured such that the agent can interact not only in the world but also conceive states and/or state transitions or trajectories, or actions that are not experienced by the agent in the world. Such states conceived by agents can also be referred to as synthetic states, synthetic trajectories and synthetic actions imagined by agents. As part of the WMS, a processor of an LM device of the LM system can implement a Synthetic State & Trajectory Generation System (SSTGS) that is configured to manage generation of states and transition behavior for the agent's capability to conceive states/actions that are not experienced in the world (also referred to as the agents capability to imagine). FIG. 14 is a schematic illustration of generation of synthetic states by an LM system 1400, according to an embodiment. The LM system 1400 can be substantially similar in structure and/or function to the LM systems 100, 400, 500, 700, and/or 1100, and can implement methods similar to methods 600 and/or 800 described herein. In some embodiments, the synthetic state generation in the LM system 1400 can be implemented by an LM device substantially similar in structure and/or function to the LM devices 105, 305, and/or 405, described herein.

Managed by the Executive Model, the agent can create and/or define synthetic trajectories to generate temporal abstractions that can be reused in the live environment. Derived from past actual experience, synthetic states and their transitions enable the agent to learn new sub-goals, attention and affordances from experience in an offline manner for example, when an environment has not been actually experienced by the agent. These behaviors and goals/attentional/affordances can serve as templates for future use and can improve agent performance.

An ML model including an Executive Model can implement an environment or world that can assume include an original state or a source state (e.g., states S1, S2, S5, S6, and S7). An original state or source state can be used to generate one or more synthetic states. To create and/or define a synthetic state (SS) (e.g., synthetic states 0, 2, and 3), a new set of features can be selected using the features associated with the original state as the source (e.g., state features associated with states S1, S2, S5, S6, and S7). Actions can be generated from a subset of actions associated with one or more original states. The executive model can then estimate transition Q-values based on the average Q-values of the original state. Thus, synthetic state generation is achieved through the re-evaluation of an instant state's attended state features and its action space. The Executive Model (EM) selects new features to be associated with a state and creates and/or defines a new synthetic state with actions and reward values that can be based on the actions, rewards, and/or values associated with the source action value. The system is configured to generate synthetic states and can build targeted temporal abstraction candidates for the agent to use in the future and can accelerate agent learning of the environment through more effective use of its current experience.

Figure 15A:
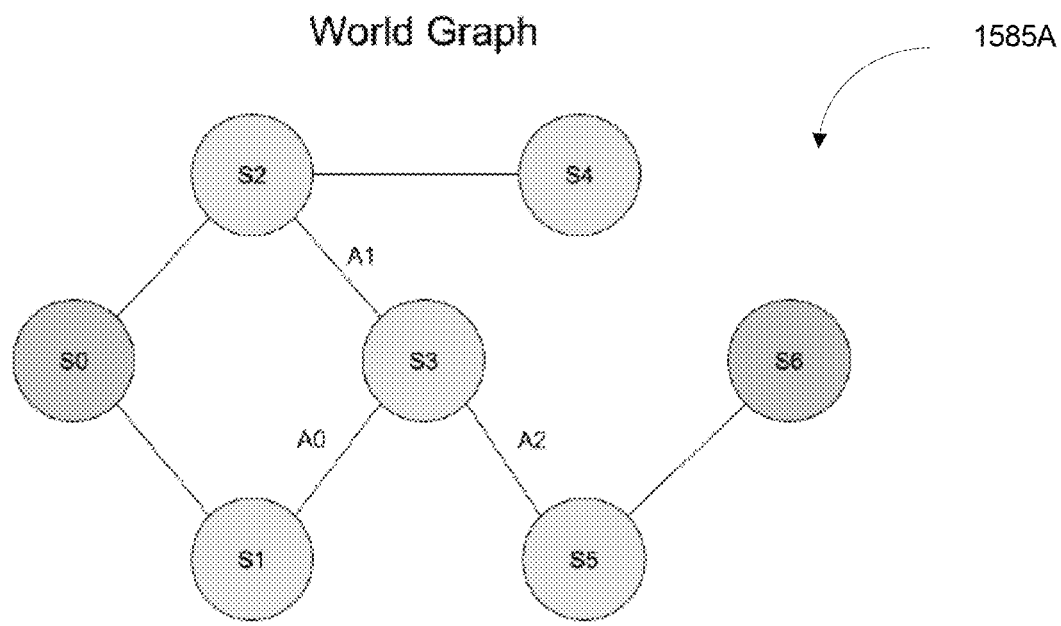
FIGS. 15A and 15B are schematic representations of state transition graphs that can be implemented by a livestock management system, according to an embodiment. The graphs are shown to be without and with including synthetic states and actions, respectively.
Figure 15B:
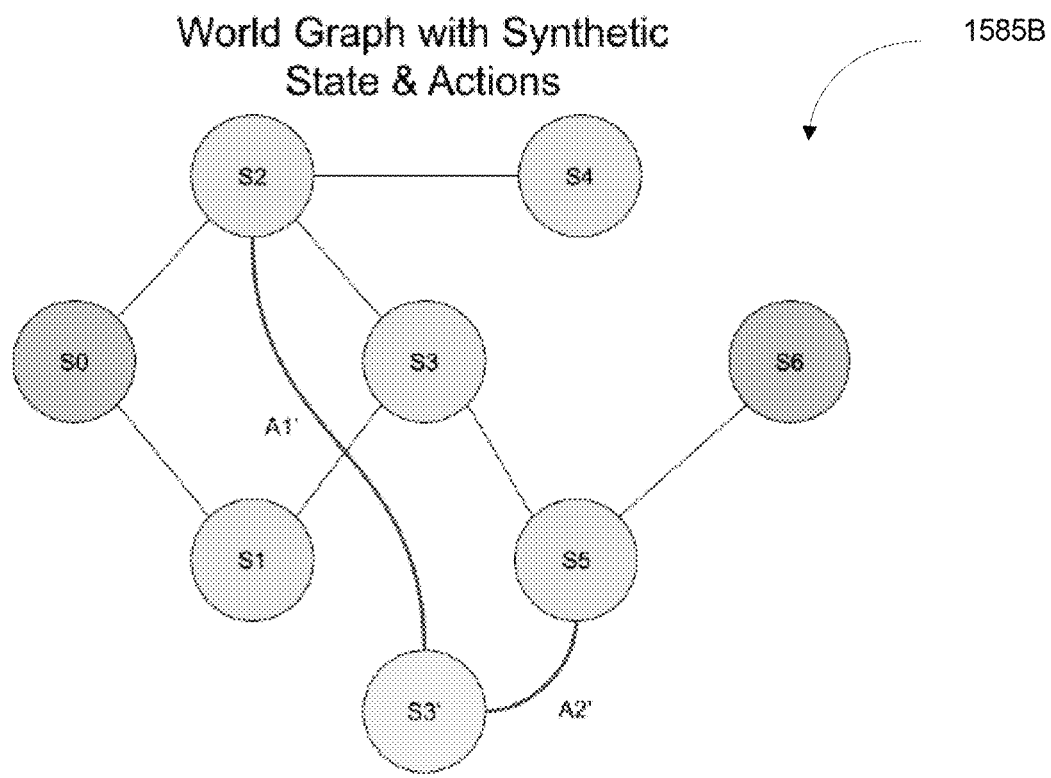
Figure 16:
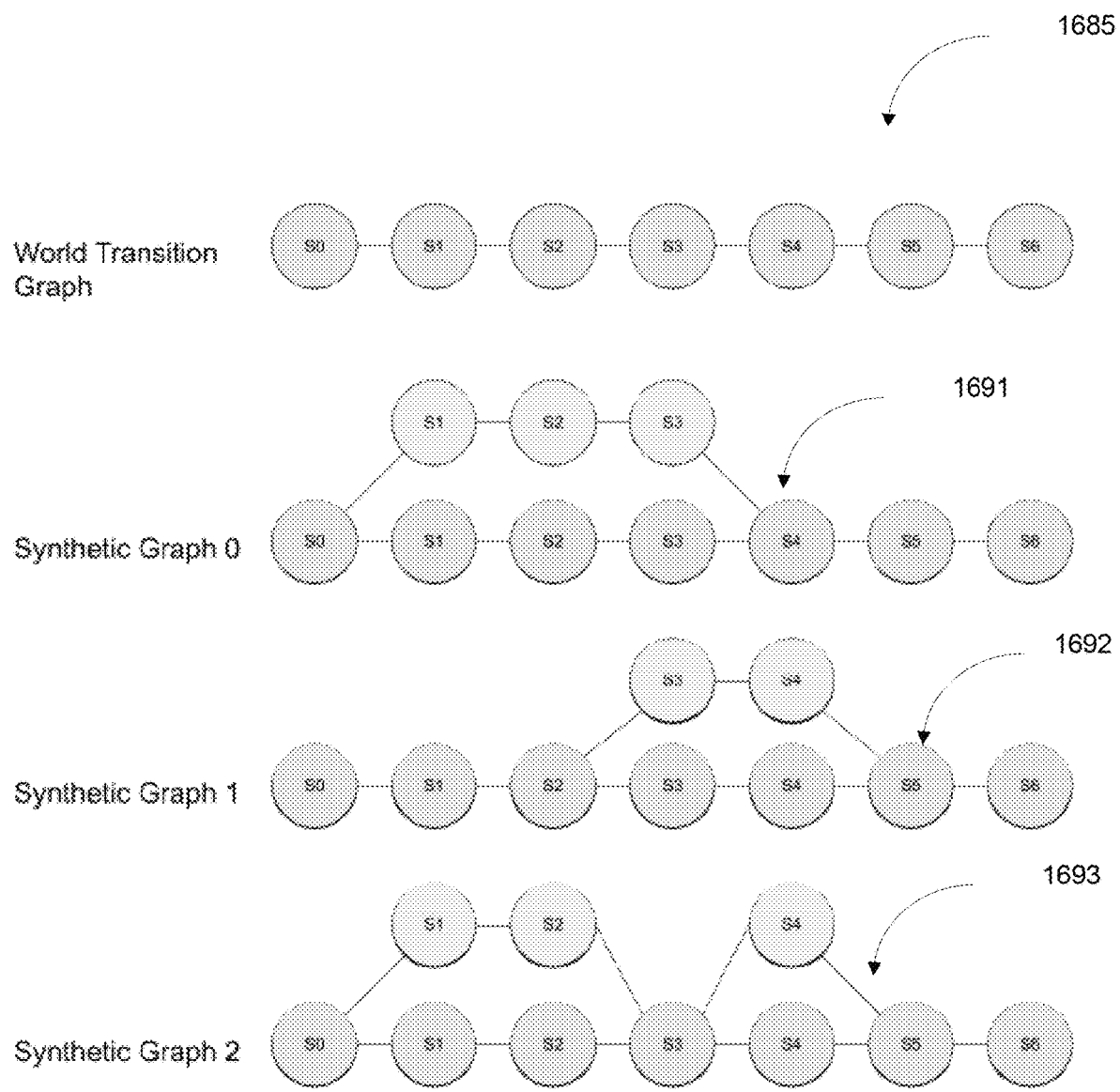
FIG. 16 is a schematic representation of an example world state transition graph implemented in a world environment, and a set of example synthetic state transition graphs similar to the world state transition graph but also including synthetic states and synthetic actions that can be implemented by a livestock management system, according to an embodiment.

In addition to the creation and/or definition of synthetic states, a WMS can create and/or define synthetic trajectories based on the current model of the world. Through this the agent generates new temporal abstractions with estimated reward values. These skills are then tested in the real world and retained/discarded depending on the quality of the behavior. The creation and/or definition of targeted synthetic trajectories can conserve processing and memory use because creation and/or definition of targeted synthetic trajectories can be implemented in an offline and/or low priority process while the agent is executing an option in the world. Options allow the agent to execute preprogramed behaviors freeing the agent to allocate processing resources to planning and behavior generation through synthetic experience simulations. FIGS. 15A and 15B illustrate world graphs representing potential state transition trajectories without and with including synthetic trajectories 1589. In some implementations, synthetic states and/or synthetic trajectories can be included in temporal abstractions. FIG. 16 illustrates an example world transition graph 1685 that is associated with a world simulated by an LM system according to an embodiment. FIG. 16 also illustrates three example synthetic graphs 1691, 1692, and 1693, representing temporal abstractions that include synthetic trajectories that allow transitions between states included in the graph 1685, but via synthetic states. The synthetic trajectories can be generated and implemented in a simulation by the LM system that can be similar to a synthetic experience or conceived/imagined by an agent in the LM system, according to an embodiment. Learning of temporal abstractions can have an exponential impact on agent learning of environments. Additionally, the synthetic trajectories allow the agent to test different attentional and behavioral constraints that may prove to me more reliable in appraising and execution of behavior. An example of this can be the agent shifting the agent's attention to features associated to physical health such as somatic cell counts over milk fat content. This can then be adjusted by the agent to ensure that actions that change medicinal type are enabled in addition to feed type adjustment. In another scenario, the animal cohort can be in optimal and/or desired health and production quality based on which the system can create skills that prevent the use of medicinal treatments unnecessarily.

In some embodiments, similar to the generation of synthetic states/state transition trajectories, a subset of the action space of the parent state can be selected. An LM system can estimate action Q-values and adjust the estimated values using an executive model, allowing the executive model to update the value function of various simulated synthetic trajectories. Synthetic experience (including synthetic states/state transitions) can be implemented as a temporal abstraction that is stored as a volatile memory representation and trimmed from the agent's model over time. The trimming can be omitted when the agent encounters a portion of a synthetic trajectory or a portion of synthetic state in a temporal abstraction in a non-synthetic context or in a simulation of a world. When the agent experiences a synthetic experience in a real simulation of the world that synthetic experience can be made permanent and its value can be updated to match the actual return value in the real simulation or model.

In some embodiments, an LM system can be configured to implement a feature referred to as Adaptive Lookahead which can be implemented as a part of the WMS. The Adaptive Lookahead System (ALS) can be an Executive Model (EM) controlled function that performs contextually relevant lookaheads from current or expected future states to guide behavior selection. Similar to Monte Carlo methods, ALS can provide an agent the ability to optimize and/or improve the use of lookahead for the agent. This system balances internal simulation time and live behavior to improve agent computational needs while providing improved action selection through experience search. Managed by the EM, the agent is configured to learn how to optimize this process minimizing its computational load with improved reward gains over time.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made.

Although various embodiments have been described as having particular features and/or combinations of components, other embodiments are possible having a combination of any features and/or components from any of embodiments as discussed above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

In this disclosure, references to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. The use of any and all examples, or exemplary language ("e.g.," "such as," "including," or the like) provided herein, is intended merely to better illuminate the embodiments and does not pose a limitation on the scope of the embodiments or the claims.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. A method, comprising: training a machine learning model associated with a set of hyperparameters to receive an indication associated with a health status of a managed livestock and a value associated with a bioproduct quality of the managed livestock and output, based on the set of hyperparameters, a feed selection configured to increase a likelihood of collectively improving the health status of the managed livestock and the bioproduct quality of the managed livestock, the set of hyperparameters including at least one of a discount factor associated with a weight of future rewards in the machine learning model, or a threshold value to balance between exploration and exploitation within the machine learning model; receiving, at a first time, a first value of the bioproduct quality and a first indication of the health status of the managed livestock; generating a set of input vectors based on the first value of the bioproduct quality and the first indication of the health status of the managed livestock; providing the set of input vectors to the machine learning model to generate a first output indicating a first feed selection to be used to feed the managed livestock, the first feed selection configured to, upon consumption, collectively improve the health status of the managed livestock and the bioproduct quality of the managed livestock based on the first value and the first indication; receiving, at a second time, at least one of a second value of the bioproduct quality or a second indication of the health status of the managed livestock; and automatically adjusting at least one hyperparameter from the set of hyperparameters in response to receiving the second value of the bioproduct quality or the second indication of the health status such that the machine learning model is configured to generate a second output indicating a second feed selection to be used to feed the managed livestock, the second feed selection configured to, upon consumption, collectively improve the health status of the managed livestock and the bioproduct quality of the managed livestock based on the second value and the second indication.

2. The method of claim 1, wherein the first value of the bioproduct quality includes at least one of a measure of protein in milk produced by the managed livestock, a measure of fat in milk produced by the managed livestock, an amount of dry extract in milk produced by the managed livestock, or an amount of milk produced by the managed livestock.

3. The method of claim 1, wherein the first indication of the health status includes at least one of a measure of bacteria in milk produced by the managed livestock, a measure of somatic cells in milk produced by the managed livestock, a measure of urea in milk produced by the managed livestock, a measure of casein in milk produced by the managed livestock, or a measure of inhibitors identified in milk produced by the managed livestock.

4. The method of claim 1, wherein the first output further indicates at least one medicine to administer to the managed livestock to collectively improve the health status of the managed livestock and the bioproduct quality of the managed livestock based on the first value and the first indication.

5. The method of claim 1, wherein the first feed selection is configured to, upon consumption, improve the bioproduct quality of the managed livestock by reducing an amount of leaked protein.

6. The method of claim 1, wherein the first feed selection is configured to collectively improve the health status of the managed livestock and the bioproduct quality of the managed livestock by increasing a likelihood that at least one indication of the health status meets a criterion while improving at least one indication of the bioproduct quality.

7. The method of claim 1, wherein the first output further indicates a projected amount of time needed to administer the first feed selection to the managed livestock for the feed selection to collectively improve the health status of the managed livestock and the bioproduct quality of the managed livestock.

8. The method of claim 1, wherein the machine learning model is trained based on reinforcement learning.

9. The method of claim 1, wherein the second value of the bioproduct quality and the second indication of the health status indicates a change in at least one of the bioproduct quality or the health status over a period of time,
the automatically adjusting includes automatically adjusting the at least one hyperparameter to improve the second feed selection from the first feed selection based on the change.

10. An apparatus, comprising:
a memory; and
a hardware processor operatively coupled to the memory, the hardware processor configured to:
train a machine learning model to receive inputs associated with health status of a managed livestock, receive a value associated with a bioproduct quality of the managed livestock, and identify, by automatically constructing hierarchical states, temporal abstractions based on the inputs and the value to be used to identify a feed selection configured to increase a likelihood of collectively improving the health status of the managed livestock and the bioproduct quality of the managed livestock;
receive at least one of a target value of the bioproduct quality or a target value of the health status;
receive a current value of the bioproduct quality and a current indication of the health status of the managed livestock;
generate a set of feature vectors based on the current value of the bioproduct quality, the current indication of the health status, and the at least one of the target value of the bioproduct quality or the target value of the health status; and
provide the set of feature vectors to the machine learning model to generate, based on the temporal abstractions identified by the machine learning model, an output including a feed selection configured to, upon consumption by the managed livestock, increase a likelihood of collectively improving the health status of the managed livestock and the bioproduct quality of the managed livestock.

11. The apparatus of claim 10, wherein the current value of the bioproduct quality includes at least one of a measure of protein in milk produced by the managed livestock, a measure of fat in milk produced by the managed livestock, an amount of dry extract in milk produced by the managed livestock, or an amount of milk produced by the managed livestock.

12. The apparatus of claim 10, wherein the current indication of the health status includes at least one of a measure of bacteria in milk produced by the managed livestock, a measure of somatic cells in milk produced by the managed livestock, a measure of urea in milk produced by the managed livestock, a measure of casein in milk produced by the managed livestock, or a measure of inhibitors identified in milk produced by the managed livestock.

13. The apparatus of claim 10, wherein the feed selection is configured to, upon consumption, improve the bioproduct quality of the managed livestock by reducing an amount of leaked protein.

14. The apparatus of claim 10, wherein the output further indicates at least one medicine to administer to the managed livestock to collectively improve the health status of the managed livestock and the bioproduct quality of the managed livestock based on the current value of the bioproduct quality, the current indication of the health status, and the at least one of the target value of the bioproduct quality or the target value of the health status.

15. A non-transitory processor-readable medium storing code representing instructions to be executed by a processor, the instructions comprising code to cause the processor to: receive at least one of a target value of a health status of a managed livestock or a target value of a bioproduct quality of the managed livestock; receive an indication of the health status of the managed livestock; receive an indication of the bio product quality of the managed livestock; generate a set of input vectors based on the at least one of the target value of the health status or the target value of the bioproduct quality, the indication of the bioproduct quality, and the indication of health status; and provide the set of input vectors to a machine learning model trained to generate, based on a set of hyperparameters of the machine learning model, an output indicating a feed selection to be used to feed the managed livestock, the feed selection configured to, upon consumption, increase a likelihood of collectively improving the health status of the managed livestock and the bioproduct quality of the managed livestock, the feed selection configured to be included in a feed blend to be administered to the managed livestock, the set of hyperparameters including at least one of a discount factor associated with a weight of future rewards in the machine learning model, or a threshold value to balance between exploration and exploitation within the machine learning model.

16. The non-transitory processor-readable medium of claim 15, wherein the indication of the bioproduct quality includes at least one of a measure of protein in milk produced by the managed livestock, a measure of fat in milk produced by the managed livestock, an amount of dry extract in milk produced by the managed livestock, or an amount of milk produced by the managed livestock.

17. The non-transitory processor-readable medium of claim 15, wherein the indication of the health status includes at least one of a measure of bacteria in milk produced by the managed livestock, a measure of somatic cells in milk produced by the managed livestock, a measure of urea in milk produced by the managed livestock, a measure of casein in milk produced by the managed livestock, or a measure of inhibitors identified in milk produced by the managed livestock.

18. The non-transitory processor-readable medium of claim 15, wherein the feed selection is configured to, upon consumption, improve the bioproduct quality of the managed livestock by reducing an amount of leaked protein.

19. The non-transitory processor-readable medium of claim 15, wherein the output further indicates at least one medicine to administer to the managed livestock to collectively improve the health status of the managed livestock and the bioproduct quality of the managed livestock based on the indication of the bioproduct quality, the indication of the health status, and the at least one of the target value of the health status or the target value of the bioproduct quality.

* * * * *